(12) United States Patent
Hansquine et al.

(10) Patent No.: US 8,750,324 B2
(45) Date of Patent: Jun. 10, 2014

(54) SINGLE WIRE BUS INTERFACE

(75) Inventors: David W. Hansquine, San Diego, CA (US); Brett C. Walker, San Diego, CA (US); Muhammad Asim Muneer, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 575 days.

(21) Appl. No.: 12/557,736

(22) Filed: Sep. 11, 2009

(65) Prior Publication Data

US 2010/0064074 A1 Mar. 11, 2010

Related U.S. Application Data

(62) Division of application No. 10/851,787, filed on May 20, 2004, now abandoned.

(51) Int. Cl.
*H04L 12/66* (2006.01)
(52) U.S. Cl.
USPC .......................................................... 370/463
(58) Field of Classification Search
None
See application file for complete search history.

(56) References Cited

U.S. PATENT DOCUMENTS

| | | | |
|---|---|---|---|
| 4,675,864 A | 6/1987 | Bliek et al. | |
| 5,237,322 A | 8/1993 | Heberle | |
| 5,247,657 A | 9/1993 | Myers | |
| 5,448,554 A | 9/1995 | Van Steenbrugge | |
| 5,495,240 A | 2/1996 | Heberle | |
| 5,684,828 A * | 11/1997 | Bolan et al. | 340/10.2 |
| 5,809,518 A | 9/1998 | Lee | |
| 5,809,519 A | 9/1998 | Lee | |
| 5,852,406 A | 12/1998 | Edde et al. | |
| 5,862,354 A | 1/1999 | Curiger et al. | |
| 6,038,400 A | 3/2000 | Bell et al. | |
| 6,112,275 A | 8/2000 | Curry et al. | |

(Continued)

FOREIGN PATENT DOCUMENTS

| | | |
|---|---|---|
| EP | 0693729 A1 | 1/1996 |
| JP | 61259360 A | 11/1986 |

(Continued)

OTHER PUBLICATIONS

User Defineable Local Serical Bus Connects 04-08-16 Bit Microcontrollers, Edward Golberg, 1991, NEC.

(Continued)

*Primary Examiner* — Jae Y Lee
(74) *Attorney, Agent, or Firm* — Eric Ho

(57) ABSTRACT

Embodiments disclosed herein address the need for a single wire bus interface. In one aspect, a device communicates with a second device via a single wire bus using a driver for driving the bus with a write frame comprising a start symbol, a write indicator symbol, an address, and data symbols. In another aspect, the device receives one or more data symbols on the single wire bus during a read frame. In yet another aspect, a device communicates with a second device via a single wire bus using a receiver for receiving a frame on the single wire bus comprising a start symbol, a write indicator symbol, an address, and one or more data symbols, and a driver for driving return read data associated with the address when the write indicator identifies a write frame. Various other aspects are also presented. These aspects provide for communication on a single wire bus, which allows for a reduction in pins, pads, or inter-block connections between devices.

27 Claims, 20 Drawing Sheets

(56) References Cited

U.S. PATENT DOCUMENTS

| | | | |
|---|---|---|---|
| 6,298,066 B1* | 10/2001 | Wettroth et al. | 370/449 |
| 7,003,309 B2 | 2/2006 | Suzuki et al. | |
| 7,406,100 B2 | 7/2008 | Rocas et al. | |
| 7,519,005 B2* | 4/2009 | Hejdeman et al. | 370/252 |
| 7,606,955 B1 | 10/2009 | Falik et al. | |
| 2002/0118735 A1 | 8/2002 | Kindred | |
| 2002/0172263 A1 | 11/2002 | Kindred et al. | |
| 2004/0019720 A1* | 1/2004 | Trembley | 710/110 |
| 2005/0259609 A1 | 11/2005 | Hansquine et al. | |
| 2006/0031618 A1 | 2/2006 | Hansquine et al. | |

FOREIGN PATENT DOCUMENTS

| | | | |
|---|---|---|---|
| JP | 2141857 A | 5/1990 |
| JP | 4274637 A | 9/1992 |
| JP | 6336355 A | 12/1994 |
| JP | 8065325 A | 3/1996 |
| JP | 10200586 A | 7/1998 |
| JP | 2000194609 | 7/2000 |
| JP | 2001142434 A | 5/2001 |
| JP | 2002108314 | 4/2002 |
| KR | 0161668 | 12/1998 |
| WO | WO0002134 | 1/2000 |

OTHER PUBLICATIONS

International Search Report, PCT/US2005/018107—International Search Authority—European Patent Office, Oct. 11, 2005.

NEC, on Chip Peripheral Program Example, Aug. 1999.

Written Opinion, PCT/US2005/018107—international Search Authority European Patent Office, Oct. 11, 2005.

* cited by examiner

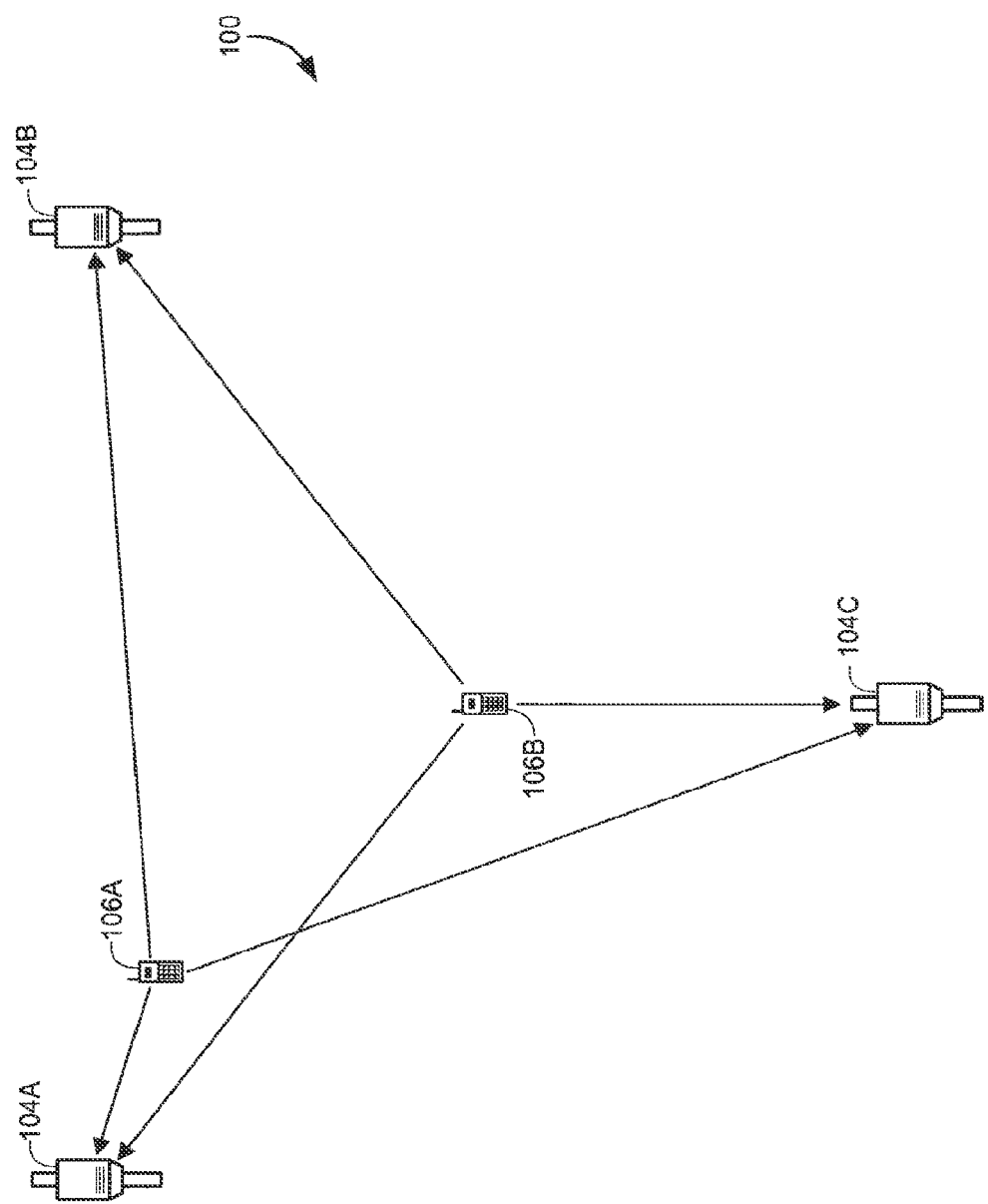
FIG. 1

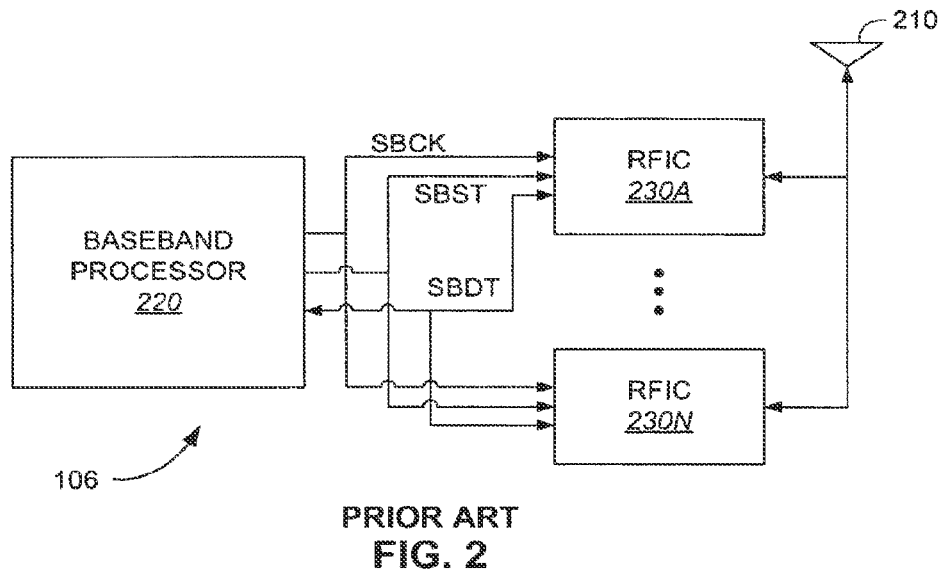
PRIOR ART
FIG. 2
PRIOR ART
FIG. 3

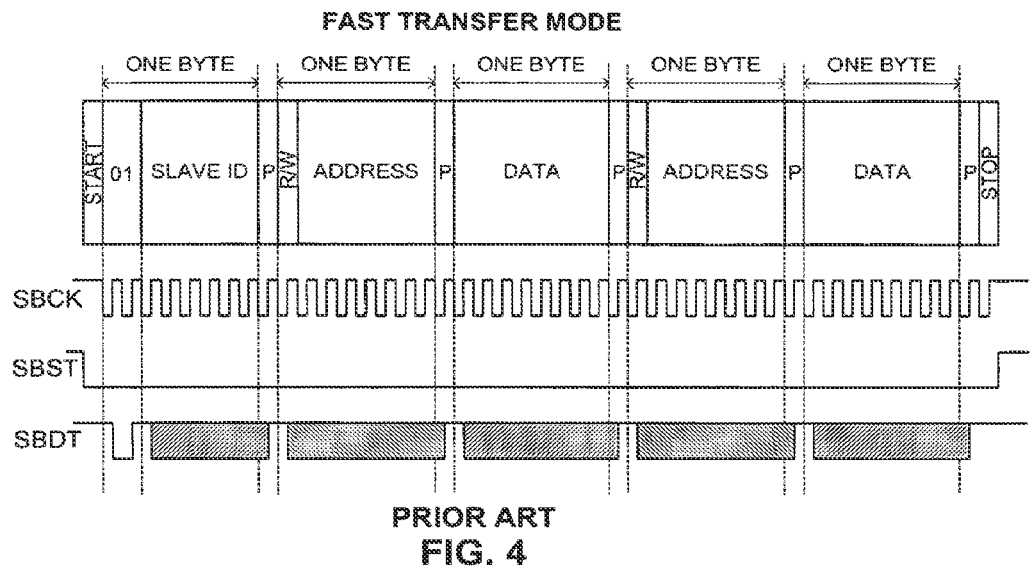
PRIOR ART
FIG. 4
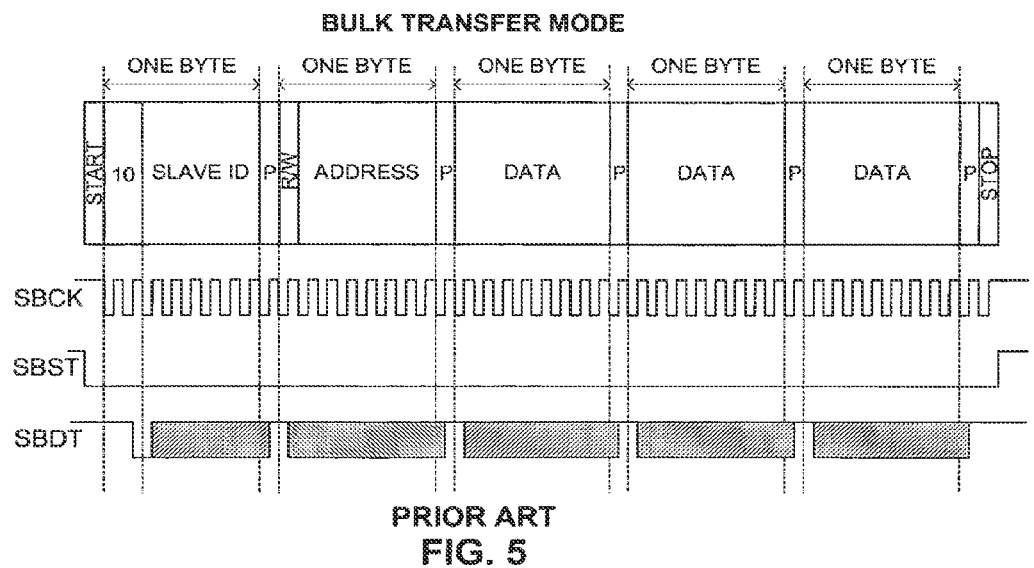
PRIOR ART
FIG. 5

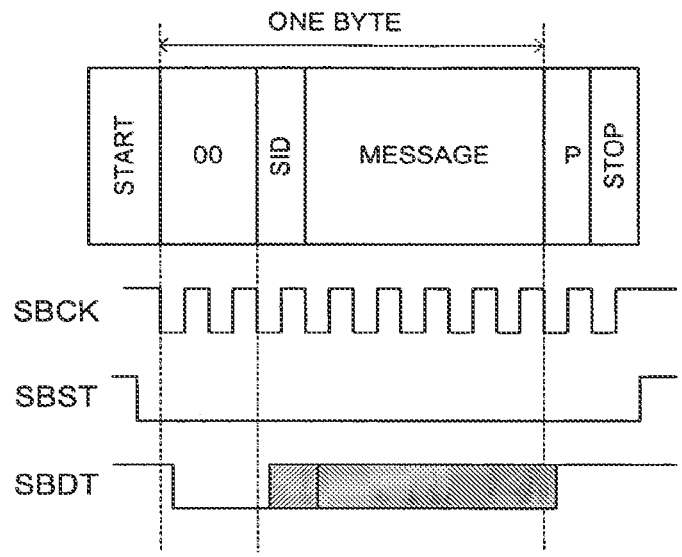
PRIOR ART
FIG. 6
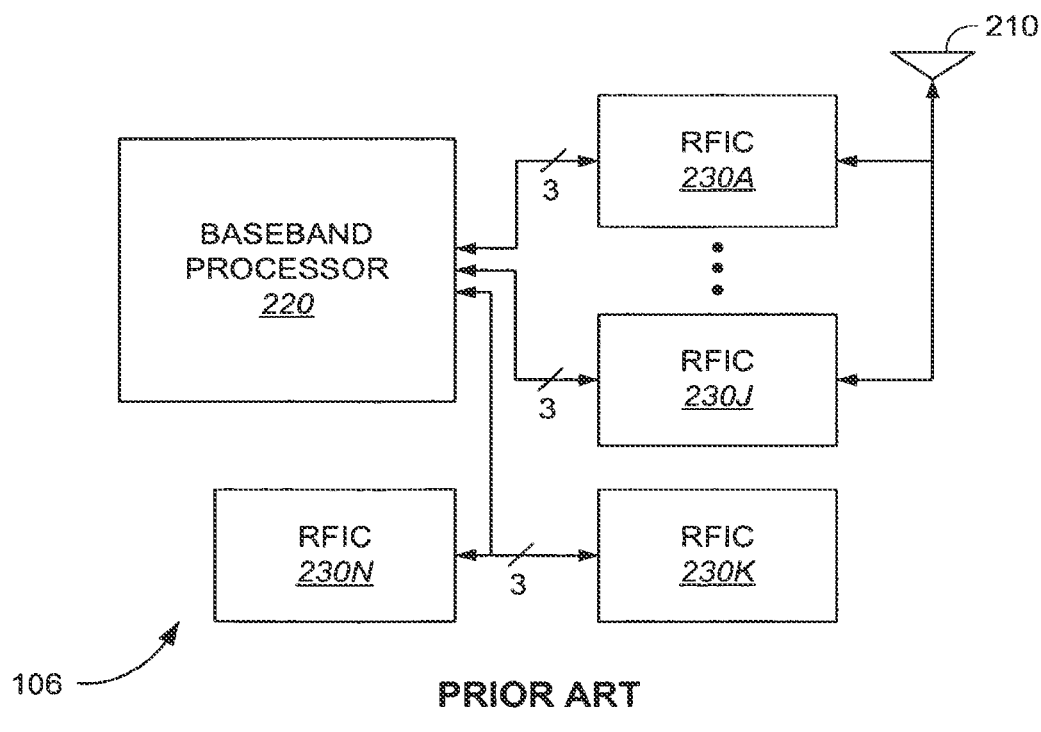
PRIOR ART
FIG. 7

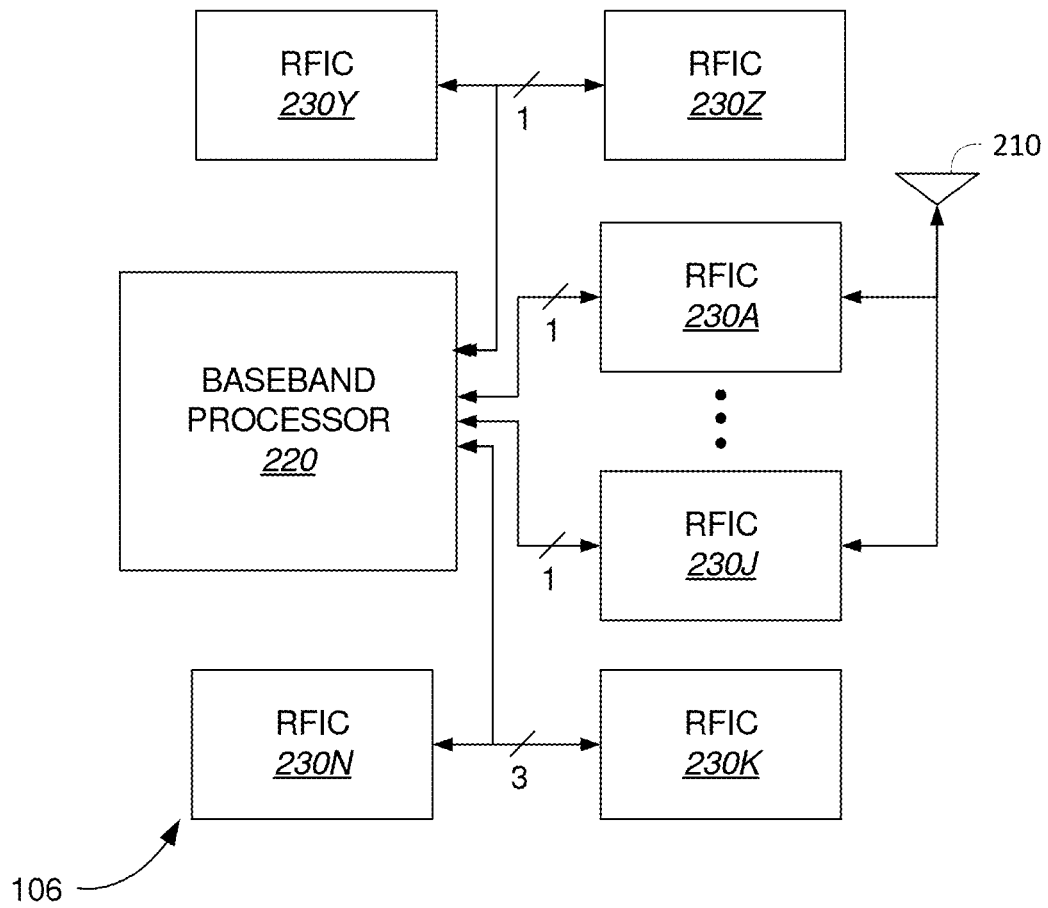
FIG. 8

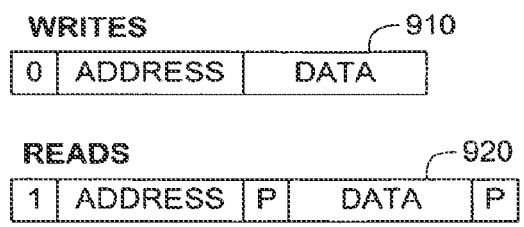
FIG. 9
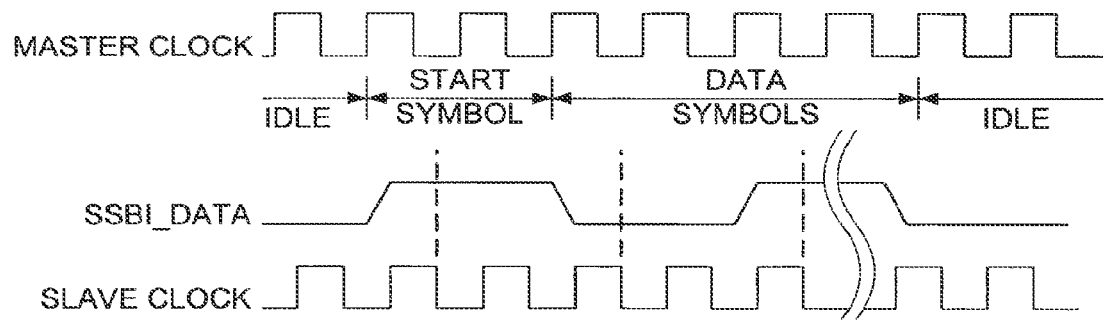
FIG. 10

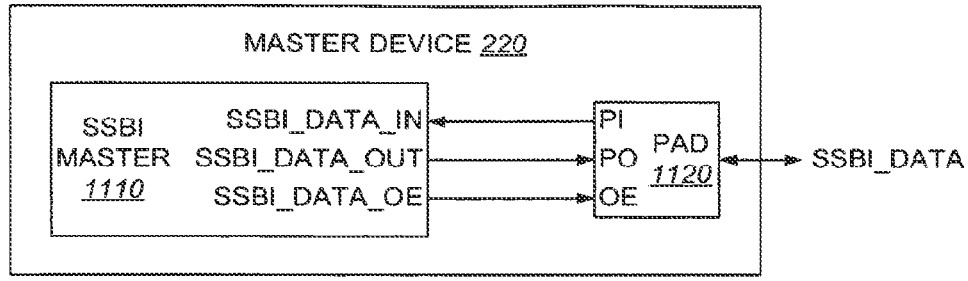
FIG. 11
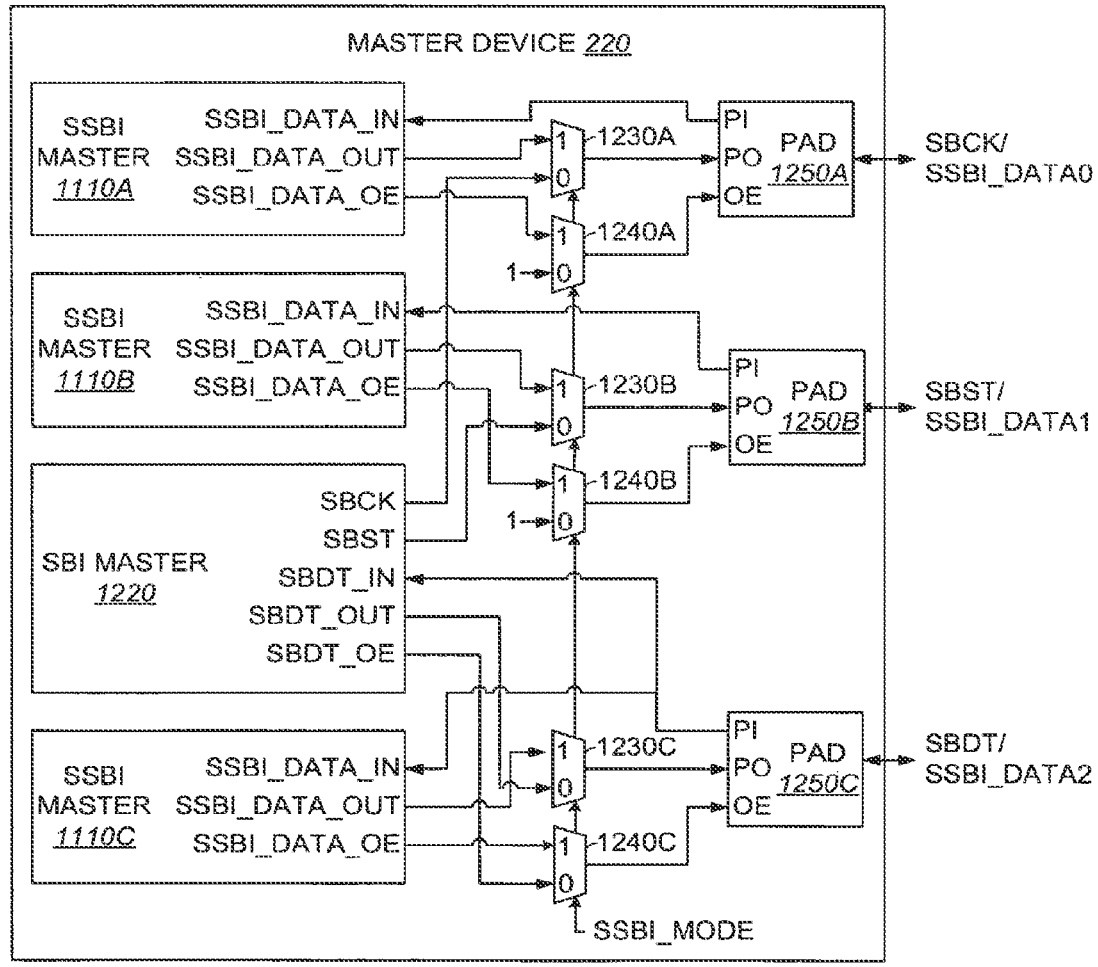
FIG. 12

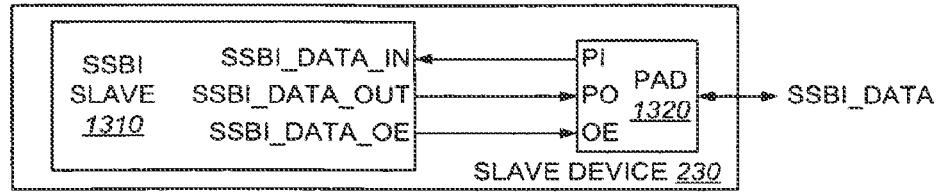
FIG. 13
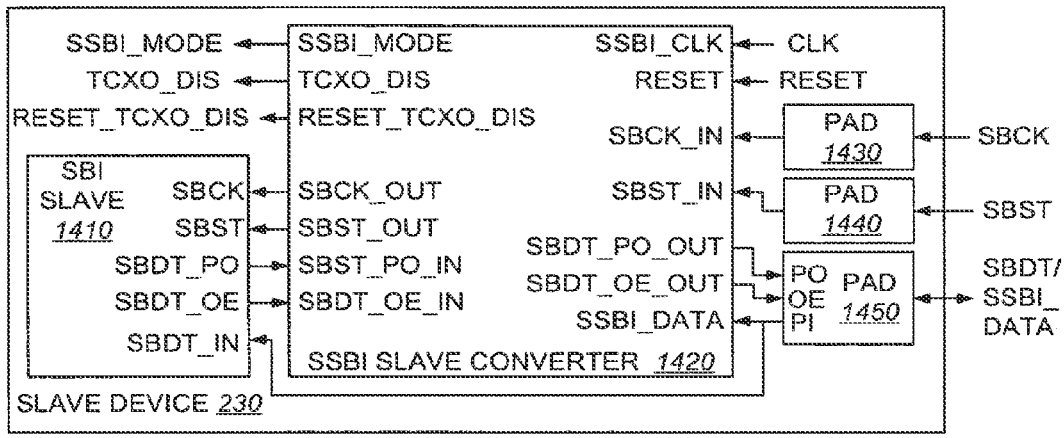
FIG. 14
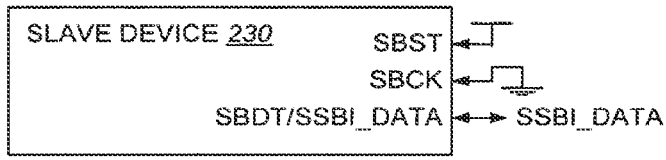
FIG. 15
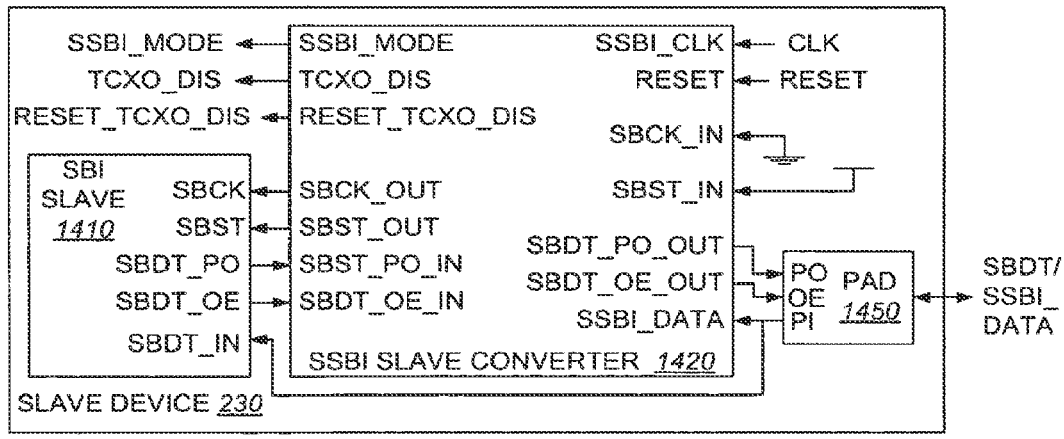
FIG. 16

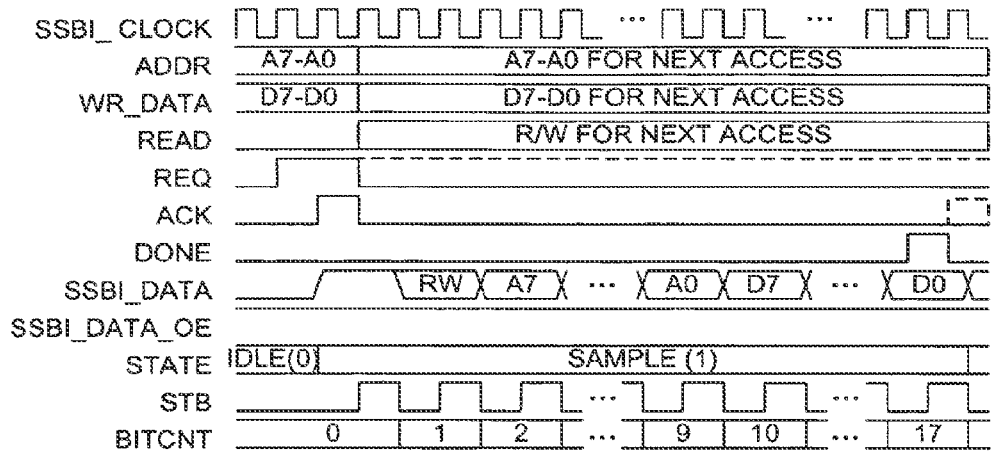
FIG. 17
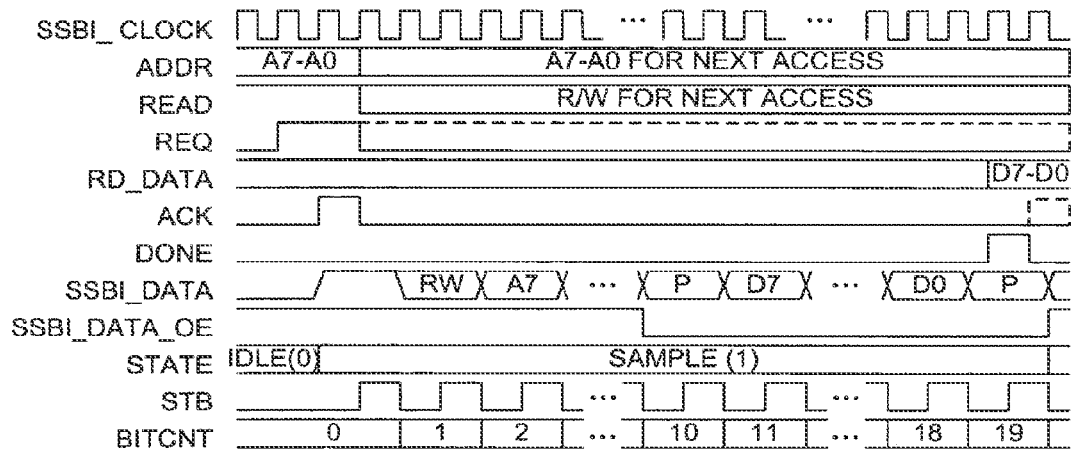
FIG. 18

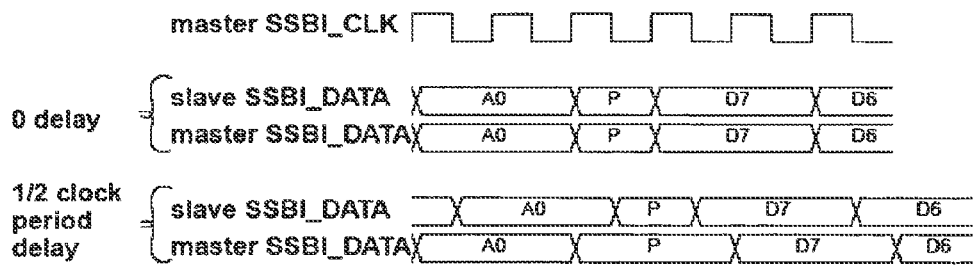
FIG. 19
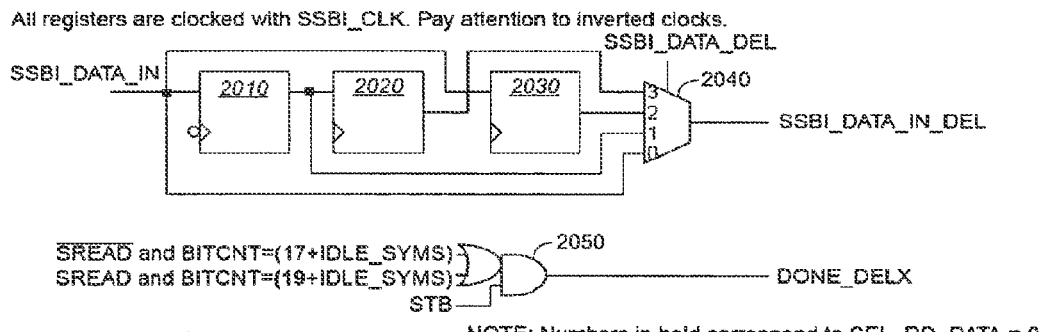
FIG. 20
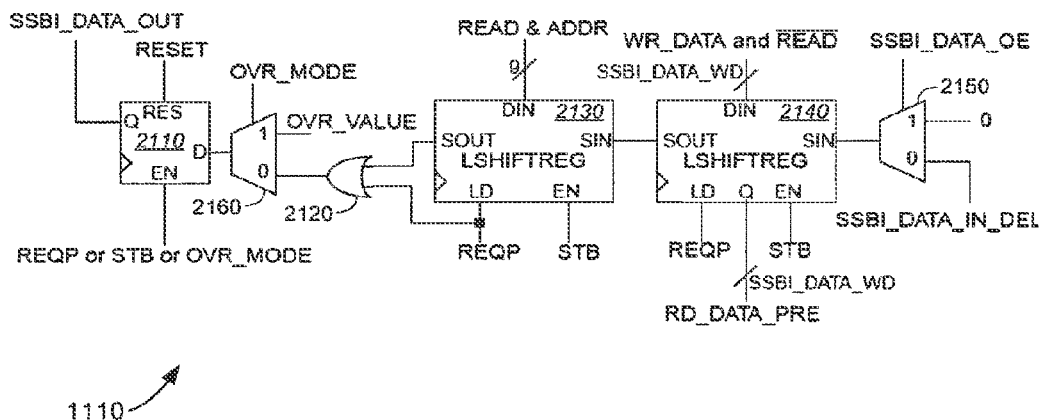
FIG. 21

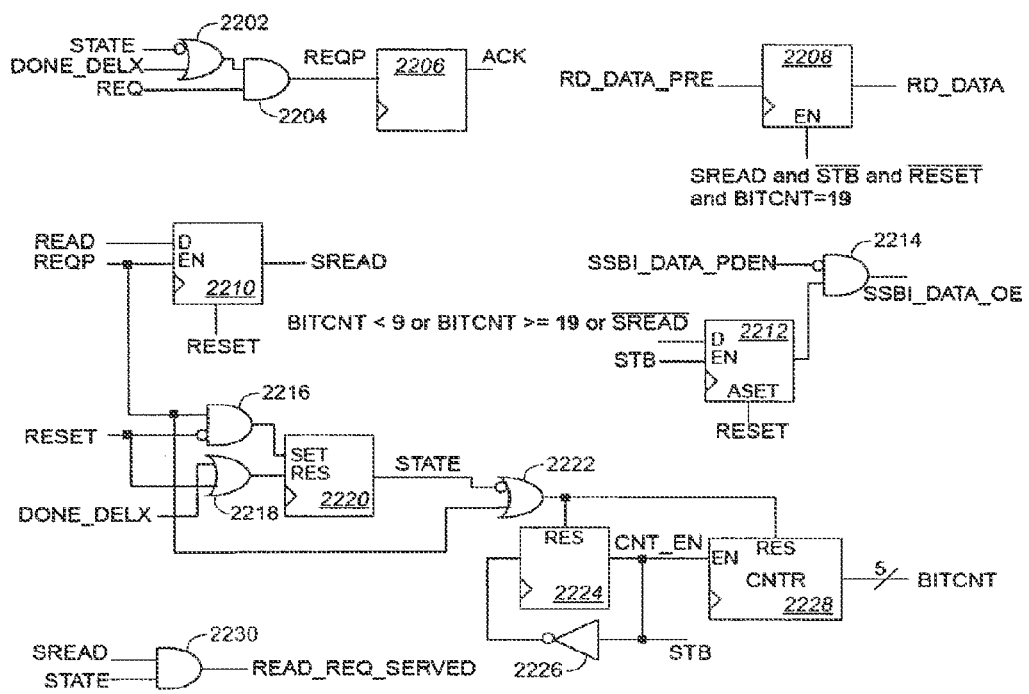
FIG. 22

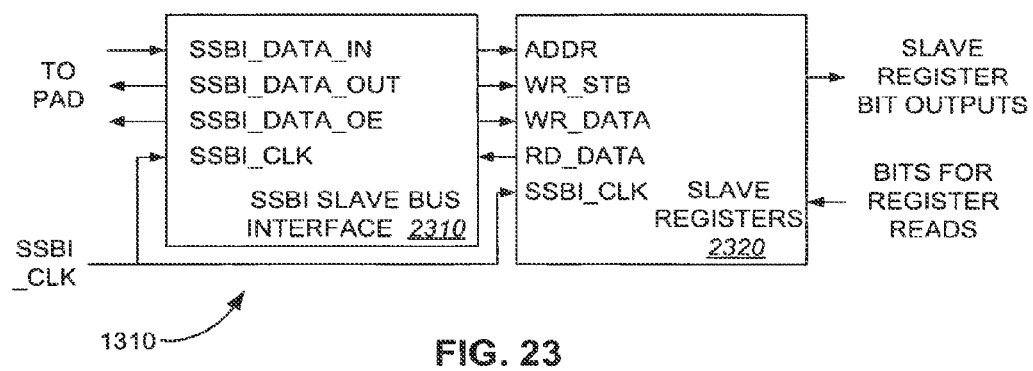
FIG. 23
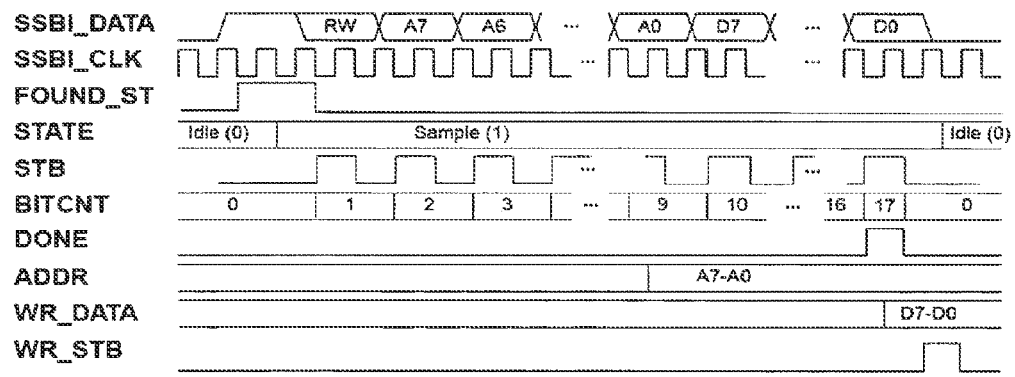
FIG. 24

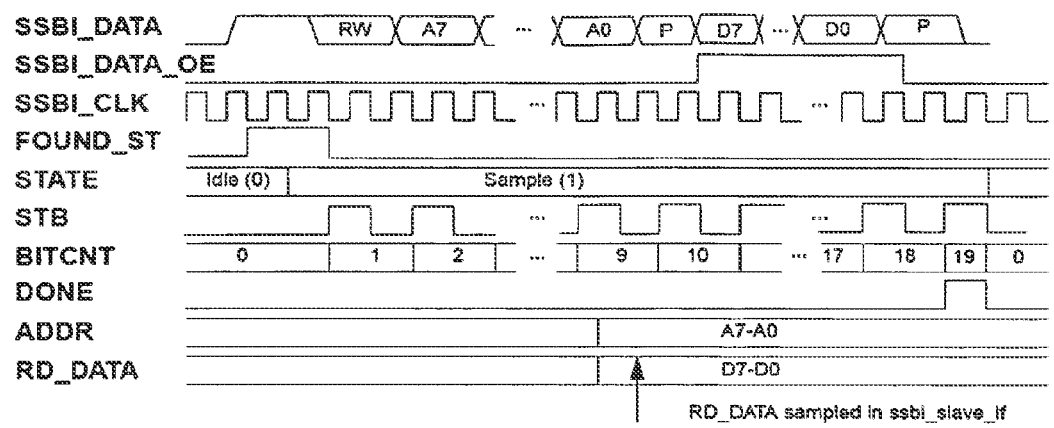
FIG. 25

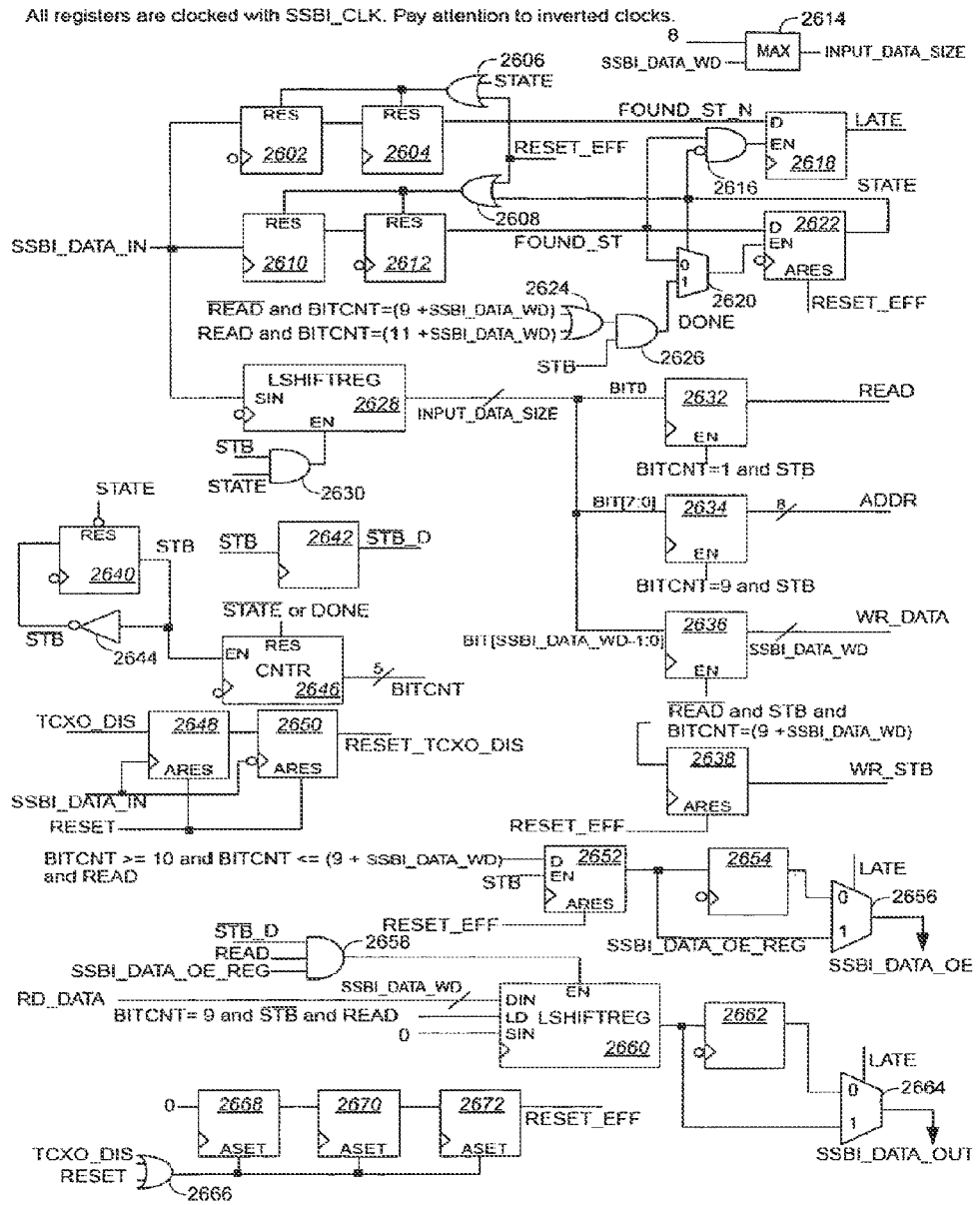
FIG. 26

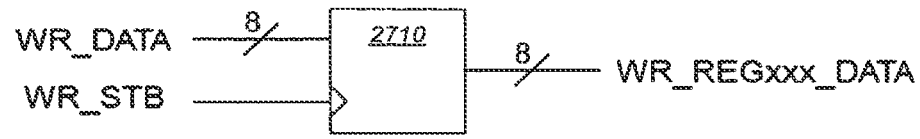
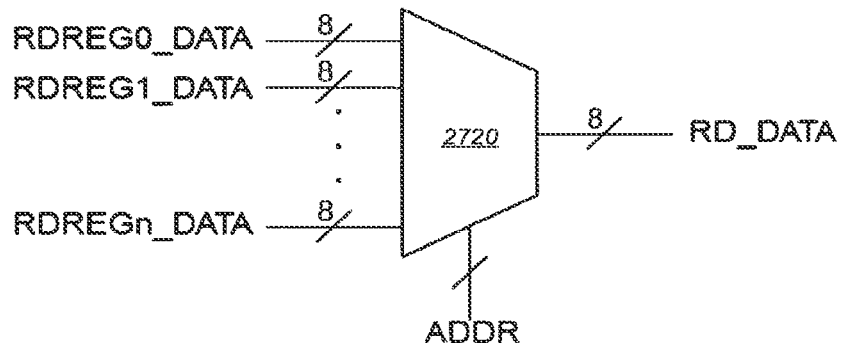
FIG. 27
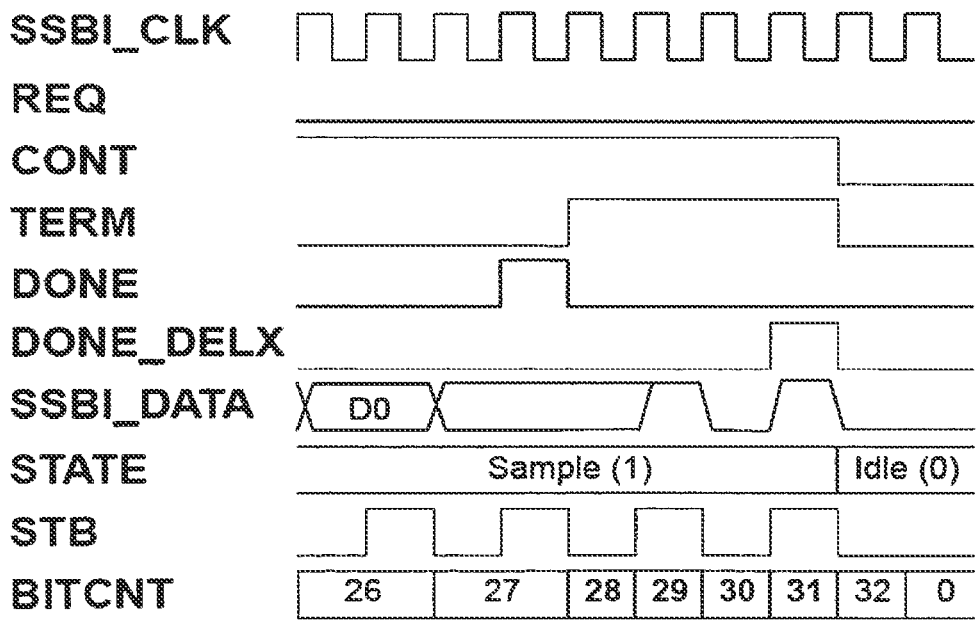
FIG. 28

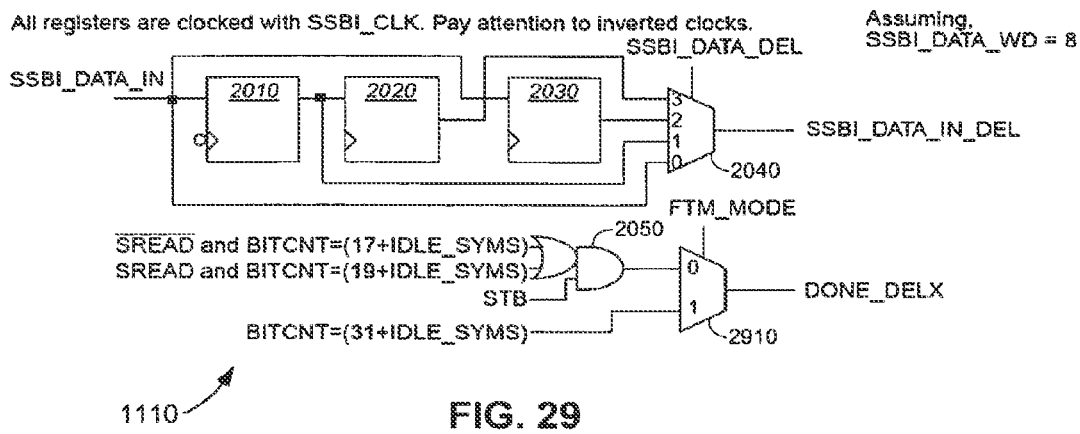
FIG. 29
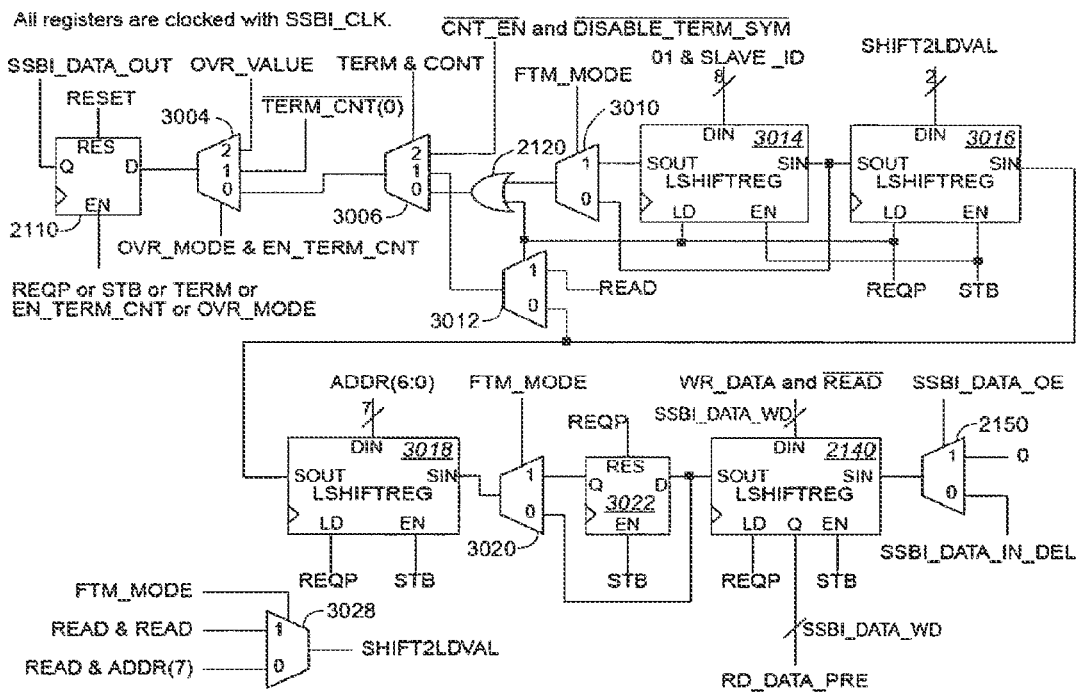
FIG. 30

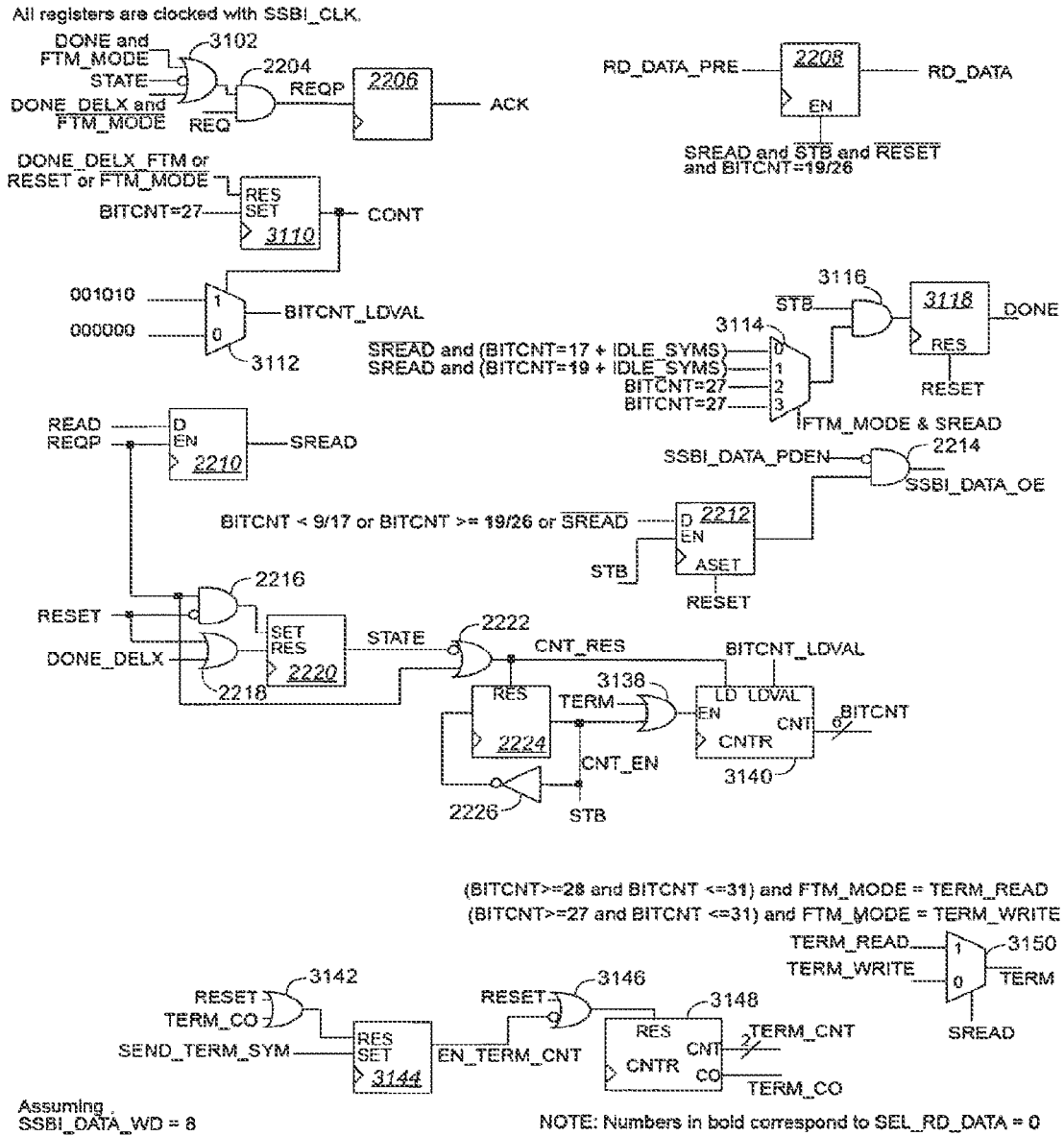
FIG. 31

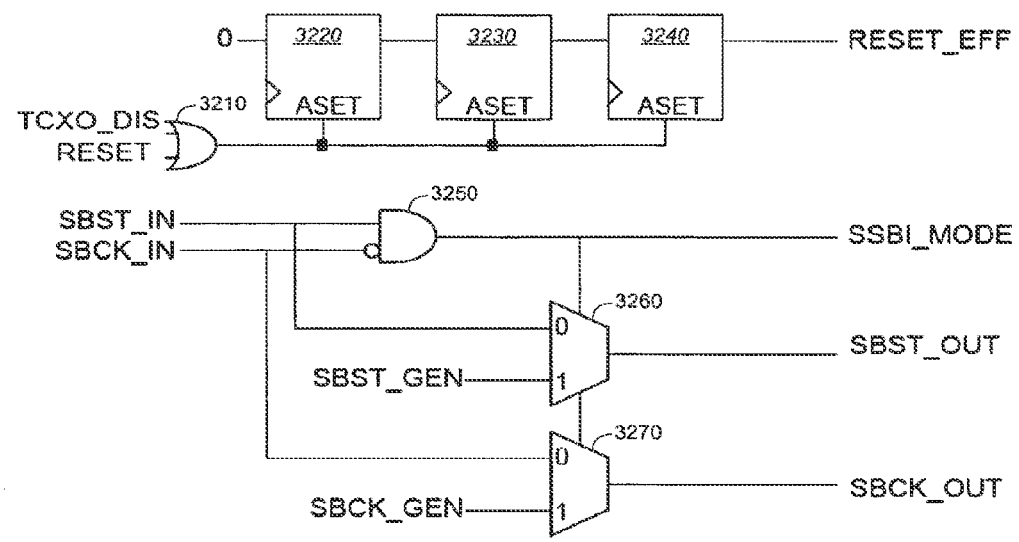
FIG. 32

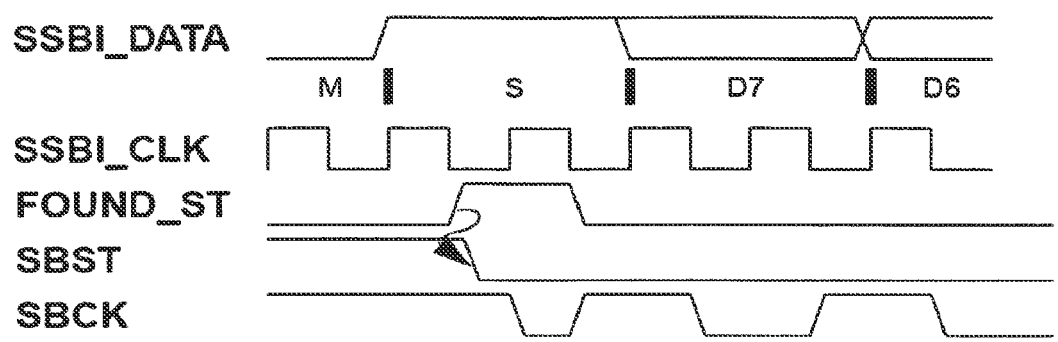
FIG. 33
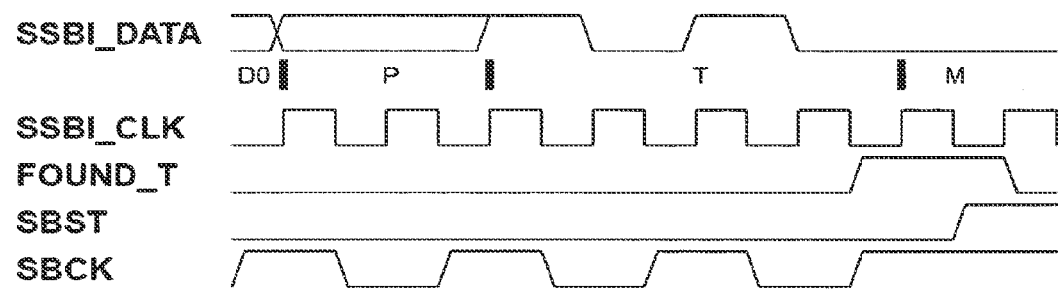
FIG. 34

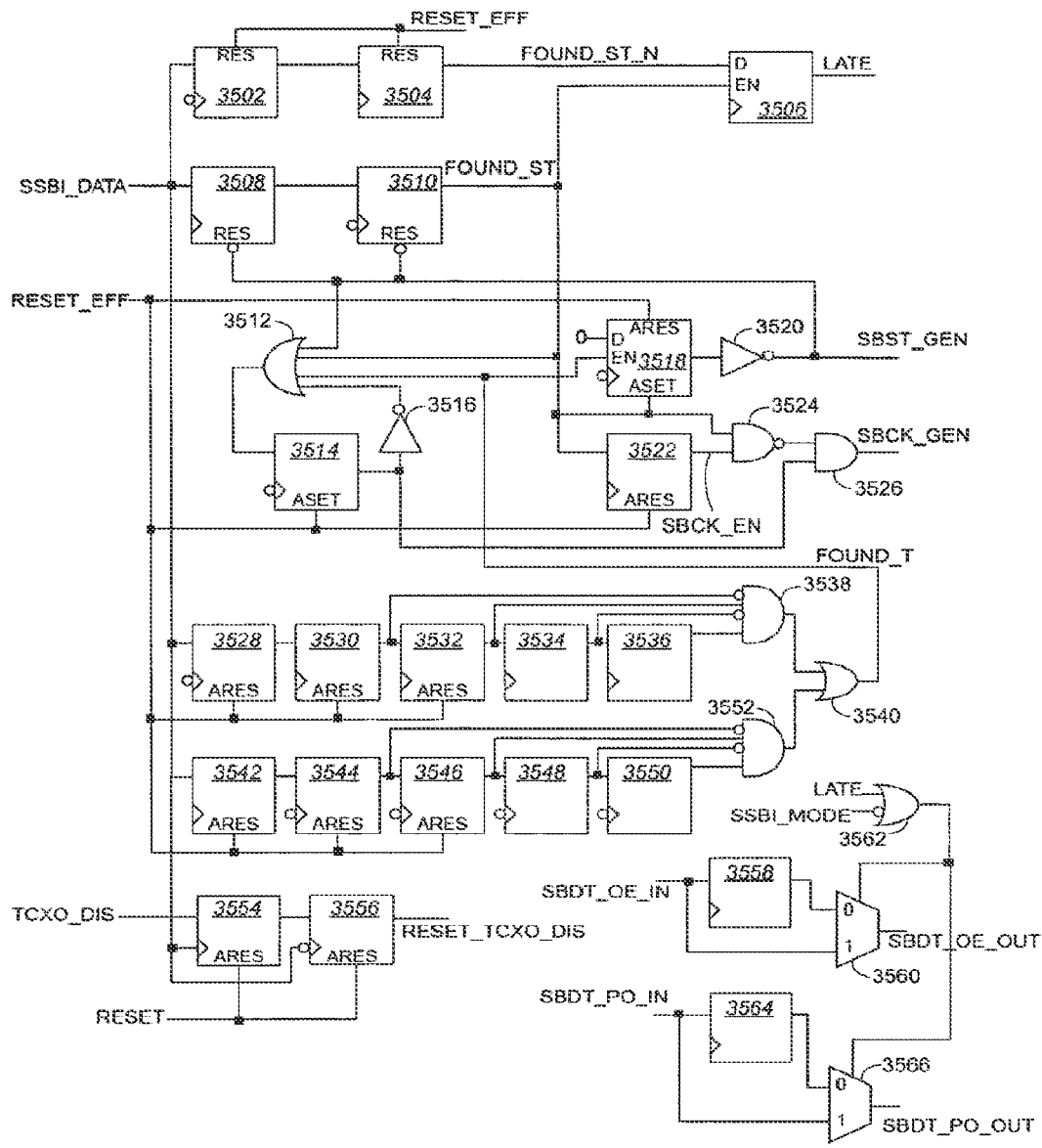
FIG. 35

SINGLE WIRE BUS INTERFACE

CLAIM OF PRIORITY UNDER 35 U.S.C. §120

The present application for patent is a divisional of patent application Ser. No. 10/851,787, entitled "SINGLE WIRE BUS INTERFACE", filed May 20, 2004, and assigned to the assignee hereof and hereby expressly incorporated by reference herein.

REFERENCE TO CO-PENDING APPLICATIONS FOR PATENT

The present application for patent is related to the following co-pending U.S. patent Ser. No. 10/851,526, entitled "SINGLE WIRE AND THREE WIRE BUS INTEROPERABILITY", filed May 20, 2004, assigned to the assignee hereof, and expressly incorporated by reference herein.

BACKGROUND

1. Field

The present invention relates generally to integrated circuits, and more specifically to communication between master and slave components using a single wire bus interface.

2. Background

Wireless communication systems are widely deployed to provide various types of communication such as voice and data. Example wireless networks include cellular-based data systems. The following are several such examples: (1) the "TIA/EIA-95-B Mobile Station-Base Station Compatibility Standard for Dual-Mode Wideband Spread Spectrum Cellular System" (the IS-95 standard), (2) the standard offered by a consortium named "3rd Generation Partnership Project" (3GPP) and embodied in a set of documents including Document Nos. 3G TS 25.211, 3G TS 25.212, 3G TS 25. 213, and 3G TS 25.214 (the W-CDMA standard), (3) the standard offered by a consortium named "3rd Generation Partnership Project 2" (3GPP2) and embodied in "TR-45.5 Physical Layer Standard for cdma2000 Spread Spectrum Systems" (the IS-2000 standard), and (4) the high data rate (HDR) system that conforms to the TIA/EIA/IS-856 standard (the IS-856 standard).

A wireless communication device commonly incorporates multiple components. For example, a baseband processor may interface with one or more Radio Frequency (RF) or other components. The baseband processor may generate and receive baseband signals, often in digital format. One or more Integrated Circuits (ICs) may be deployed to provide functions such as analog to digital conversion, digital to analog conversion, filtering, amplification, upconversion, downconversion, and many others. Various parameters and commands may be written to one or more slave devices by a master device (such as a baseband processor). The master device may need to receive (i.e. read) parameters and other data from one or more ancillary components (such as RFICs). Such configurations of master devices and slave devices may be deployed in devices outside of the communications field as well.

A Serial Bus Interface (SBI) protocol has been deployed in the prior art, which uses three signals to perform communication between a master device and one or more slave devices (i.e. a 3-wire interface). While the SBI protocol allows for multiple slaves to share one interface, some components have demonstrated sensitivity to activity of other components on a shared interface. Thus, some SBI interfaces have been deployed with a single master and a single slave device, to avoid such interference. Adding additional interfaces, as described, may require the addition of three pins (or pads) to the master device for each additional interface. This may add additional complexity and/or cost, due to increased die size, increased pin count, etc. It is therefore desirable to reduce the number of pins required to interface between a master device and a slave device.

There exist in the prior art a number of designs for master devices and slave devices that support the SBI interface. It may be desirable to provide for a new interface to communicate with existing SBI components, to increase interoperability, and to allow for new devices, either masters or slaves, to be phased into use with each other, as well as with legacy components. It is also desirable to provide a means for existing designs to be modified for communication on a reduced pin interface with a minimum amount of design time to increase time to market for new products and speed the rollout of the new interface.

There is therefore a need in the art for a single wire bus interface for communication between a master device and one or more slave devices. There is a further need for master devices, slave devices, and converters that interoperate with existing serial bus interfaces, such as those adapted to the SBI protocol.

BRIEF DESCRIPTION OF THE DRAWINGS

The present invention will be readily understood by the following detailed description in conjunction with the accompanying drawings, wherein like reference numerals designate like structural elements, and in which:

FIG. 1 is a general block diagram of a wireless communication system capable of supporting a number of users;

FIG. 2 depicts a portion of a prior art mobile station;

FIG. 3 depicts the formats of the three transfer modes of the SBI interface;

FIG. 4 illustrates the Fast Transfer Mode (FTM) access type;

FIG. 5 illustrates the Bulk Transfer Mode (BTM) access type;

FIG. 6 illustrates the Interrupt Transfer Mode (ITM) access type;

FIG. 7 depicts a prior art SBI configuration;

FIG. 8 depicts an embodiment comprising a combination of SBI and Single-wire Serial Bus Interface (SSBI) interfaces;

FIG. 9 illustrates the SSBI transfer format;

FIG. 10 is a timing diagram illustrating an example embodiment of the SSBI signaling scheme;

FIG. 11 is an example master device for supporting SSBI;

FIG. 12 depicts an example master device configured to support SSBI or SBI;

FIG. 13 is an example slave device for supporting SSBI;

FIG. 14 is an example slave device for supporting SSBI and SBI, comprising an SBI slave and an SSBI slave converter;

FIG. 15 depicts the example slave of FIG. 14 configured for SSBI-only communication;

FIG. 16 depicts an example SSBI-only slave comprising an SBI slave and an SSBI slave converter;

FIG. 17 is a timing diagram illustrating SSBI writes, and SSBI master signals;

FIG. 18 is a timing diagram illustrating SSBI reads, and SSBI master signals;

FIG. 19 illustrates the interrelationship between the clocks in a master and slave device;

FIGS. 20-22 detail portions of example logic suitable for deployment in an example SSBI master;

FIG. 23 depicts an example embodiment of an SSBI slave;

FIG. 24 is a timing diagram illustrating SSBI writes, and SSBI slave signals;

FIG. 25 is a timing diagram illustrating SSBI reads, and SSBI slave signals;

FIG. 26 illustrates example circuitry suitable for deployment in an example SSBI slave bus interface;

FIG. 27 depicts example logic suitable for deployment as a slave registers block;

FIG. 28 illustrates the waveforms showing the end of an example burst, including a termination symbol;

FIGS. 29-31 illustrate example circuitry suitable for deployment in an example SSBI master, modified to support FTM mode;

FIG. 32 illustrates a portion of an SSBI slave converter;

FIG. 33 depicts waveforms illustrating the start of an FTM transfer;

FIG. 34 depicts waveforms illustrating the end of an FTM transfer; and

FIG. 35 illustrates a portion of additional circuitry for an example SSBI slave converter.

DETAILED DESCRIPTION

A detailed description of a preferred embodiment of the invention is provided below. While the invention is described in conjunction with that preferred embodiment, it should be understood that the invention is not limited to any one embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention. The present invention may be practiced according to the claims without some or all of these specific details. For the purpose of clarity, technical material that is known in the technical fields related to the invention has not been described in detail so that the present invention is not unnecessarily obscured.

FIG. 1 is a diagram of a wireless communication system 100 that may be designed to support one or more CDMA standards and/or designs (e.g., the W-CDMA standard, the IS-95 standard, the cdma2000 standard, the HDR specification, the 1xEV-DV system). In an alternative embodiment, system 100 may additionally support any wireless standard or design other than a CDMA system.

For simplicity, system 100 is shown to include three base stations 104 in communication with two mobile stations 106. The base station and its coverage area are often collectively referred to as a "cell". In IS-95, cdma2000, or 1xEV-DV systems, for example, a cell may include one or more sectors. In the W-CDMA specification, each sector of a base station and the sector's coverage area is referred to as a cell. As used herein, the term base station can be used interchangeably with the terms access point or Node B. The term mobile station can be used interchangeably with the terms user equipment (UE), subscriber unit, subscriber station, access terminal, remote terminal, or other corresponding terms known in the art. The term mobile station encompasses fixed wireless applications.

The word "exemplary" is used herein to mean "serving as an example, instance, or illustration." Any embodiment described herein as "exemplary" is not necessarily to be construed as preferred or advantageous over other embodiments.

Depending on the CDMA system being implemented, each mobile station 106 may communicate with one (or possibly more) base stations 104 on the forward link at any given moment, and may communicate with one or more base stations on the reverse link depending on whether or not the mobile station is in soft handoff. The forward link (i.e., downlink) refers to transmission from the base station to the mobile station, and the reverse link (i.e., uplink) refers to transmission from the mobile station to the base station.

FIG. 2 depicts a portion of a prior art mobile station 106. The illustrations detailed throughout may also be deployed in other wireless communication devices, such as a base station 104, as well as any other device or devices in which master/slave communication is desired. In this example, a baseband processor 220 is deployed in connection with one or more ancillary Integrated Circuits (ICs), as well as other components, not shown. Baseband processor 220 provides communication processing for signals to be transmitted and received, in accordance with one or more communication systems or standards, examples of which are detailed above. A typical baseband processor 220 performs digital processing of incoming and outgoing signals, and may perform various other types of processing, including running various applications. A baseband processor may comprise various components, including one or more microprocessors, digital signal processors, memory, and other general or special purpose circuitry of various types. A baseband processor may comprise various components for receiving and transmitting signals according to one or more communications specifications or standards, such as encoders, interleavers, modulators, decoders, deinterleavers, demodulators, searchers, and various other components, examples of which are well known in the art. A baseband processor may incorporate digital circuitry, analog circuitry, or a combination of both.

The ancillary ICs connected with baseband processor 220 are labeled RFIC 230A-230N. Example ancillary ICs include Radio Frequency (RF) ICs, which may incorporate various functions such as amplifiers, filters, mixers, oscillators, digital-to-analog (D/A) converters, analog-to-digital (A/D) converters, and the like. The components necessary for communication according to a standard may be incorporated in multiple RFICs 230. Any RFIC 230 may include components that may be shared for use with multiple communication systems. RFICs are shown for illustration only. Any type of ancillary IC may be connected with baseband processor 220.

In this example, the RFICs 230 receive and/or transmit via antenna 210, through which a link may be established with one or more base stations 104. Antenna 210 may incorporate multiple antennas, as is well known in the art.

SBI Protocol

For communication of various parameters and commands, a 3-wire interface has been designed for such communication. This 3-wire interface is referred to as a Serial Bus Interface (SBI). The 3-wire interface includes a clock line (SBCK), a start/stop line (SBST), and a data line (SBDT). The SBI interface is detailed further below. The SBI interface designates a master device and one or more slave devices. In this example, the baseband processor 220 serves as the master, and one or more RFICs 230 serve as slave devices. The SBI interface is not limited as such, and the master and slave devices may be of any type. In detailed example embodiments below, baseband processor 220 may be interchanged with master device 220, and RFIC 230 may be interchanged with slave device 230. A baseband processor 220 may also communicate with various RFICs 230 on various dedicated lines, either analog or digital, in addition to the SBI bus, not shown.

Note that, as shown in FIG. 2, multiple slave devices may share the same three master device connections (SBCK, SBST, and SBDT). Various other connections between RFICs 230 and baseband processor may be deployed, but are not shown in FIG. 2. A mobile station 106 may also incorporate various other components for use in performing communications or running applications. Those details are not shown, for clarity of discussion.

The SBI interface defines three types of transfer modes, the formats of which are depicted in FIG. 3. Fast Transfer Mode (FTM) provides for multiple sequences of accesses to any slave, including both reads and writes. Each access in the sequence identifies the address to which or from which the access is to be made.

Bulk Transfer Mode (BTM) provides for multiple sequential accesses to a single slave. The accesses in a BTM transfer may be reads or writes, but not both. The address for the bulk transfer need only be transmitted once. Multiple reads or writes may occur sequentially from this initial address.

Interrupt Transfer Mode (ITM) is used to transfer a single byte of encoded information. The Slave ID (SID) indicates one of two slaves to receive the message. The 5-bit message field provides for 32 possible messages. A pause bit is transmitted after the message.

FIGS. 4-6 depict timing waveforms for FTM, BTM, and ITM, respectively. Each SBI access is performed as follows. Transactions are initiated by pulling SBST low. Transactions are terminated/completed by taking SBST high. There is at least one clock in between transactions (SBST and SBDT high). All changes in the state of SBDT occur prior to a SBCK falling edge (generally there will be setup and hold parameters specified with respect to the SBCK falling edge). The first data bit is latched on the second falling edge after SBST has gone low. Data is transmitted Most Significant Bit (MSB) first, Least Significant Bit (LSB) last. (Recall that for ITM, a single bit identifies one of two slaves, followed by a message.) Unaddressed slaves wait for the start bit of the next transaction. Data may be both read and written during a single FTM transaction. One or more pause bits are allocated for each byte transmitted. Both master and slaves release the data bus during pause bits (P) to avoid bus contention.

The first two bits indicate the access type: 01 for FTM, 10 for BTM, and 00 for ITM. The Slave ID is 6 bits while the Address and Data fields are 8 bits each. Pause bits (P) are inserted after each 8 bits to provide opportunities for the slave to return data without causing bus contention. The first bit of the Address field denotes whether the access is a read (1) or write (0). For FTM and BTM, multiple accesses can be done to the same slave without requiring the slave ID to be specified for each register access. FTM is the usual method of performing register accesses. BTM is provided to enable configuration of a larger group of consecutive addresses. Only the first register address of the burst is specified. For ITM, the Slave ID field is replaced with a 1 bit SID field to specify which slave to access. Instead of Register and Data fields, a 5-bit Message field is specified.

In practice, it has turned out that, in some instances, Radio Frequency (RF) ICs 230 are sensitive to interference on a common bus. To avoid this interference, additional buses have been deployed, to isolate the traffic on one bus from one or more sensitive devices 230. An example configuration is shown in FIG. 7. In FIG. 7, baseband processor 220 communicates with RFICs 230A-230J on individual 3-wire SBI buses dedicated to each device. In this example, additional RFICs 230K and 230N are connected with a shared SBI bus. Although adding buses can resolve interference, it increases the number of pins required for the baseband processor 220, as well as the number of master controllers. For example, a baseband processor 220 may be deployed with 3 or 4 SBI ports, requiring 9 or 12 pins, respectively. The design may be complicated by overhead required to share the available ports between the various external chips 230.

SSBI Protocol

To provide the reduced interference desired for sensitive ancillary chips 230, while reducing pin count, a new single-wire bus interface is provided, detailed further below, referred to as a Single-Wire Serial Bus Interface (SSBI). FIG. 8 depicts an example mobile station 106 deployed with an independent single-wire (SSBI) bus connecting each RFIC 230A-230J with baseband processor 220. 3-wire SBI buses may also be deployed in combination with SSBI buses, if desired. This is illustrated as shown with a shared 3-wire bus connecting RFIC 230N-230K and baseband processor 220. Deploying the single-wire interface allows for reducing pin count, increasing the number of ports, or both. Increasing the number of ports may alleviate the design complication, mentioned above, that may occur when two or more devices need to share a bus interface. Note that, for clarity, in example embodiments detailed below, the SSBI interface may be explained with respect to pins and/or pads. The SSBI protocol is also applicable to inter-die connections (i.e. pad to pad connections, without pins), as well as inter-chip connections (i.e. block to block connections, with neither pads nor pins). Those of skill in the art will readily adapt the principles disclosed herein to apply to these and various other embodiments.

Alternate embodiments may include any number of single-wire buses, as well as any number of 3-wire buses. In various embodiments, examples of which are detailed below, pins may be configurable for use with either a 1-wire or 3-wire bus interface.

The example SSBI protocol detailed herein has the following properties. The pin count required is reduced with respect to the SBI interface. The bandwidth may be comparable to or better than the SBI interface. The address is increased to support additional registers, thus supporting increasingly complex slave devices. In this example, the number of addressable registers is 256.

To reduce the number of pins, the SSBI does not include the clock line (SBCK) and the start/stop line (SBST). The single line in the SSBI protocol is referred to herein as SSBI_DATA. The clock line having been removed in the interface, a local clock is used at both the master and the slave device instead. The local clocks at the master device and any slave devices do not need to be identical. The protocol accounts for offsets in phase and frequency, as detailed further below. A certain amount of frequency error is tolerated, the amount depending on the specific embodiment. The SSBI protocol is phase independent with respect to the clocks of the master and slave devices. The local clocks may be generated using local oscillators, derived from other clock sources, or various other clock generation techniques known in the art. The SSBI interface Instead of a start/stop line, a start bit is inserted into the data stream, and an idle state (IDLE) is defined. A receiving device (i.e. a slave) may monitor the data line (SSBI_DATA), sampling the predetermined IDLE values, and then beginning a transaction when a start symbol is detected. When a transaction is completed, the data line may be returned to the IDLE state, thus terminating the transfer.

The SSBI protocol may be designed with timing and waveforms selected so as to facilitate an interface between 1- and 3-wire interfaces. As will become clear, this allows for migration from the 3-wire SBI protocol to the 1-wire SSBI protocol. For example, a master device may be equipped with a logic circuit for generating both SBI and SSBI formats, to facilitate communication with earlier generation slave devices, as well as newer slave devices as they are produced. In similar fashion, an existing slave device may be equipped with conversion logic such that either SBI or SSBI formats may be received, allowing interoperability with both earlier generation master devices and new master devices. A slave may be equipped with 3 pins for the 3-wire mode, a single pin of which is dedicated for SSBI_DATA when in SSBI mode. The mode may be selected by setting pre-defined values on the unused pins when SSBI mode is desired. Furthermore, a single pin slave device may be quickly developed by adding conversion logic to the existing core, such that a single wire SSBI_DATA may be translated into legacy 3-wire SBI signals, for interfacing with the existing core. Such conversion logic, detailed further below, may be added to a slave device with minimal impact on the existing functionality, allowing the new device to be developed rapidly with high confidence. The benefits of reduced interference due to separate control lines, and pin count reduction at the master and/or slave devices may thus be achieved during a migration in the marketplace to three-wire devices to single-wire devices. Various example embodiments are detailed below.

Table 1 shows the SSBI interface signals. The SSBI interface consists of a single pin per device called SSBI_DATA. SBST is removed since the start and end of a transfer are denoted in the data stream itself. SBCK is removed, as there is a common clock at both the master and slave. It is presumed that there is a clock available at both the master and slave, referred to at SSBI_CLK. Any common clock may be used. There is no phase relationship required between the master and slave clocks. In one embodiment, to simplify routing, the two clocks may be derived from the same source. The two clocks should generally be the same frequency, although some frequency error may be corrected for. Those of skill in the art will readily tailor the amount of frequency error allowed for any given embodiment in light of the teaching herein. This clock needs to be on whenever SSBI communication is required.

TABLE 1

Modified SSBI Master Port Descriptions

| Signal | Description |
| --- | --- |
| SSBI_DATA | SSBI Data line; bidirectional; connects master device (i.e. baseband processor 220) to slave device (i.e. RFIC 230) |
| SSBI_CLK | Local clock; generated at each master and slave device for 1-wire operation |

In an example embodiment, the master device 220 comprises a pad for SSBI_DATA with the following characteristics: The pad is bidirectional. It supports drive strengths of 2 mA in low-drive mode and 5 mA in high-drive mode (this is consistent with the settings used for example SBI pads). The example pad contains a selectable pull-down device, and a selectable keeper device. Various other pads may be deployed within the scope of the present invention. In alternate embodiments, such as inter-block connections on a single die, for example, pads may be substituted with alternate components, such as tri-state drivers, muxes, and the like, as is well known by those of skill in the art.

In the example SSBI protocol, only one mode is supported, and only one register access per transfer is supported. It may be thought of as a simplification of FTM, without the need to specify the mode or slave ID. Since there is only one slave expected on the bus (although addressing schemes may be used if two or more devices are desired, described below), the slave ID bits are no longer required. As a result, there is very little overhead for each access when compared to the SBI commands. The multiple 3-wire SBI modes provided mechanisms for removing unneeded overhead in order to improve bandwidth and reduce latency. The single SSBI format provides the same benefits.

FIG. 9 illustrates the SSBI transfer format. A frame may be a read frame 920 or a write frame 910. The first bit denotes whether a read or write is performed. Read access is indicated by '1' and a write access by '0'. This assignment is not arbitrary, but in fact it prevents the Slave from accidentally seeing the read operations if the SSBI master block is inadvertently reset in the middle of an access. The Address field is a full 8 bits, and since the read/write indication is separate, all 256 addresses are now available to both reads and write registers. In the example embodiment, the address space is increased in SSBI vs. SBI. In alternate embodiments, any address space size may be deployed.

The Data field is parameterized in various embodiments described below, and can be in range from 1-16, for example. This parameter is identified below as SSBI_DATA_WD. For both address and data fields, the values are output MSB first. For writes, since the master continuously drives the bus, no Pause bits (P) are required. For reads, pause bits are used. To perform additional reads or writes, a new command is initiated on the bus. This way, the slave always knows to expect 17 symbols for a write, and 19 symbols for a read (when SSBI_DATA_WD=8).

While it is expected that one slave will be supported per SSBI port, it is possible to support two slaves (e.g., RFIC 230Y and RFIC 230Z) by having each respond to a different set of SSBI register addresses. For example, one slave could respond to addresses 0-127, while the second responds to 128-255. By using such an approach, however, there may be loading issues on the board plus the usual interference problems, as described above for the SBI protocol.

FIG. 10 is a timing diagram illustrating an example embodiment of the SSBI signaling scheme. In this example, the data line (SSBI_DATA) is low when indicating the idle state. When data is to be sent, a start bit is transmitted, a high voltage (or "1"), in this example. The start bit is used to center the receiver's sample point for sampling the incoming data stream. Following the start bit is a stream of data. Since the command formats are well defined, the receiver can determine from the data stream precisely how many bits will be sent. Thus, the receiver knows when the transfer will complete, and can reenter the idle state to wait for the next start bit. The start bit and data bits are each two clock cycles long, in this example, hence the symbol period is two cycles long. The data bits are transmitted high or low depending on whether a 1 or 0 is being sent. In an alternate embodiment, each bit could be one clock cycle long. However, in such a case it may be difficult for the receiver to find the center of a symbol since there would be only half a clock cycle of accuracy. Thus, the receiver could not guarantee it would avoid sampling the symbols when they are transitioning. With the symbols being two clock cycles long (or longer), the receiver can guarantee it is sampling the symbols somewhere between 0.5 and 1.5 cycles into the symbol, hence at least 0.5 clock cycles away from any transitions. The number of clock cycles per symbol may vary in alternate embodiments.

The clock at the receiver need not be aligned with the data. So, in essence, the SLAVE CLOCK depicted in FIG. 10 may shift left or right with respect to SSBI_DATA. In this example, the receiver starts sampling at the first falling clock edge after SSBI_DATA goes high. The sampling points are denoted by the dotted vertical lines. Each subsequent symbol is sampled every two clock periods from that point until the access is completed. Following the IDLE bit, another start symbol may be transmitted.

This SSBI protocol is resistant to frequency error. The allowed amount of such error may be varied based on the design choice in deployment of any particular embodiment. If an external clock is deployed and routed to one or more of connected components, the interface successfully operates in the presence of variable clock skew between the various components. Alternatively, one or more connected components (i.e. the master and/or any slaves) may generate their own clock, within the frequency error requirements as designed.

The transfer time of any access is not data-dependent. Transfer times are the same as for the example 3-wire SBI bus interface. Any voltage levels may be chosen for the various bit types, as will be clear to those of skill in the art. In this example, as described above, the start symbol is selected to be "1" (or a high voltage) to center the sample strobe. Idle is set to "0" (or ground). This simplifies the interface with unpowered chips. For example, RF chips (or other slave devices) may be powered on and off to conserve power. Setting idle to ground simplifies this condition.

In general, the master drives SSBI_DATA. The only time the master tri-states the bus is while read data is being driven by the slave. At all other times, the master drives the bus. Since both the master and slave devices will at different times drive the data bus, to avoid contention on the data line, the present driver of the bus releases the bus for one symbol period (two cycles in this example) prior to the next device being allowed to drive the bus. This duration will be referred to as a Pause bit. Pause bits are identified by "P" in FIG. 9. For the Pause bit, the value on the data line may be held using a pad keeper, if one is deployed. It is expected the slave will respond with read data, using the same timing as the receiver approximates the master is using, hence the read symbols should appear approximately where the master expects them.

To understand the transition between drivers, consider the following: Subsequent to the master sending the LSB of the Address field for a read access, a Pause bit is transmitted to allow time for the master to release the bus. The slave responds by driving D7 through D0, followed by releasing the data line for another Pause bit. The master may then recapture control of the bus to transmit the next symbol. Contention is avoided since the slave knows the master's timing to an accuracy of half a clock cycle based on the start bit. Since the Pause bit is two clock cycles, it may appear as short as 1.5 cycles or as long as 2.5 cycles, depending on the relative phases of the master and slave clocks. As long as the bus delay is less than 1.5 cycles, there will be no contention.

The 3-wire SBI interface has a SBST signal that asserts for the duration of the transfer and deasserts when the master is done. This makes it easy to forcibly put the slave into the idle state at any time. The master may ensure SBST is deasserted and, whether the slave is already idle or in the middle of a transfer, it should realize there is no longer a transfer and enter the idle state. With the 1-wire SBI interface, there are no signals to clearly specify this. Consider two cases: first is during power on reset, and second during normal operation. During power on, a master may take into, consideration the amount of time required to reset the various devices, and ignore SSBI activity until the reset is complete. During normal operation, as long as the master and slaves remain in sync, such that the slaves respond only to the master and that the master SSBI block is never forcibly reset during a SSBI transfer, there will be no issue.

If there is a need to reset the SSBI master at some arbitrary time, for whatever reason, it is possible that the SSBI bus may be in the middle of a read, hence a slave device will be driving the SSBI data bus. If the master is forced into Idle state, it will also drive the data bus; hence there may be contention. When the slave is not driving the bus, in response to a read access, the master entering idle will not cause contention. The slave will either remain in the idle state, or complete any current write access, then enter idle state. (In this example, since the 1-wire formats are such that writes and reads are 17 and 19 symbol periods long, for data width of 8 bits, at most, 19 symbol periods later, the slave is guaranteed to be in Idle state). To solve the issue when the slave may be driving the bus, the master may refrain from actively driving the SSBI_DATA line until it is determined that the possible contention period is over. In the example embodiment, the master will tristate SSBI_DATA and enable a pull-down device in the pad. A command to reset a control register may be used to indicate that the pull-down may be disabled. In an alternate embodiment, a write access command may be used to re-enable active control of the bus by the master, disabling the pull-down, if desired.

Converting Between SBI and SSBI

Described above are two protocols, SBI and SSBI, which may be supported using 3-wire or 1-wire interfaces (perhaps requiring some conversion features). Many devices in operation today support the SBI protocol on a 3-wire interface. Example embodiments, various examples of which are described herein, may include a master device 220 and one or more slave devices 230 that communicate using SSBI on a single wire interface. An example master device 220 for supporting SSBI is depicted in FIG. 11, and a corresponding slave device 230 is depicted in FIG. 13. It may be desirable for a master device 220 to support both SBI and SSBI on either a 1-wire or a 3-wire interface, or a combination of both. An example of such a master is depicted in FIG. 12. Similarly, a slave device may be configured to receive either protocol on either a 1-wire or a 3-wire interface. An example of such a slave device is depicted in FIG. 14.

FIG. 11 depicts an example master device 220 configured for SSBI communication on a single wire. A microprocessor, or other device, communicates with the SSBI master 1110 to perform read and write accesses (details not shown). SSBI master 1110 may also receive or generate other commands or signals, examples of which are detailed further below. The master device 220 transmits and receives data on SSBI_DATA, which is connected to pad 1120. An example pad is described above. The pad input (PI) is delivered to SSBI_DATA_IN on SSBI master 1110. The output for pad 1120 is received from SSBI_DATA_OUT of SSBI master 1110. The pad is enabled (or driven) in response to SSBI_DATA_OE from SSBI master 1110. Other functions such as keepers and pull devices may be deployed as well (details not shown). SSBI master 1110 transmits and receives according to the SSBI protocol.

FIG. 13 depicts a slave device 230 configured for SSBI communication on a single wire. Various blocks, registers, functions, etc., may interface with the SSBI slave 1310 (details not shown). SSBI slave 1310 may provide data from write accesses, and source data for read accesses, as directed by a master device, such as device 220 shown in FIG. 11. SSBI slave 1310 may also receive or generate other commands or signals, examples of which are detailed further below. The slave device 230 transmits and receives data on SSBI_DATA, which is connected to pad 1320. An example pad is described above. The pad input (PI) is delivered to SSBI_DATA_IN on SSBI slave 1310. The output for pad 1320 is received from SSBI_DATA_OUT of SSBI slave 1310. The pad is enabled (or driven) in response to SSBI_DATA_OE from SSBI slave 1310. Other functions such as keepers and pull devices may be deployed as well (details not shown). SSBI slave 1310 transmits and receives according to the SSBI protocol.

On a baseband processor, such as a master device 220, a bank of pins may be configurable to provide a combination of single and 3-wire interfaces. For example, 12 pins may be allocated, and configurable to provide a variety of bus combinations. For example, 12 single-wire interfaces or four 3-wire interfaces may be deployed. Or, one 3-wire interface may be deployed with 9 single-wire interfaces. Or two 3-wire interfaces may be deployed with 6 single-wire interfaces. Or, three 3-wire interfaces may be deployed with 3 single-wire interfaces. A limited subset of the pins may be deployed to be configurable in multiple bus interface types as well. Pins may be alternately configurable for non-SSBI or non-SBI purposes as well. Those of skill in the art will recognize that myriad combinations of pins and configurable bus types may be deployed within the scope of the present invention.

By switching to single-wire buses, additional buses may be deployed with fewer pins, and the number of components sharing a bus may be reduced. For example, deploying point-to-point single-wire buses allows for reduced interference when compared to a shared bus, and the scheduling of traffic becomes simpler and latency issues may be avoided, as point-to-point connections remove the bandwidth scheduling required on a shared bus.

FIG. 12 depicts an example master device 220 configured to support SSBI or SBI. Three pins are shown, which may be used for a 3-wire interface, or alternately for three 1-wire interfaces. There are three SSBI masters 1110A-C, and an SBI master 1220. Three pads 1250A-C receive signals via muxes 1230A-C and 1240A-C, respectively. The muxes are controlled via a signal SSBI_MODE, which indicates whether SBI or SSBI mode will be selected. 82 An SBI master 1220 is known in the art, and is not detailed herein. An example embodiment of the SBI master 1220 may be of any type. Those of skill in the art will readily adapt prior developed SBI devices or circuits, or may devise new ones, to perform the requirements of an SBI system, as described above. Example SSBI masters 1110 are detailed further below. An example SSBI master may perform the SSBI protocol, as described above, and may also perform according to the SBI protocol, in order to facilitate compatibility with other devices (described further below).

Pad 1250A is used to provide SBCK in SBI mode, and is SSBI_DATA0 in SSBI mode. The pad input (PI) is delivered as SSBI_DATA_IN to SSBI master 1110A. The pad output comes through mux 1230A, and is SSBI_DATA_OUT from SSBI master 1110A in SSBI mode, and SBCK from SBI master 1220 in SBI mode. The output enable (OE) comes through mux 1240A, and is SSBI_DATA_OE from SSBI master 1110A in SSBI mode, and set to high during SBI mode (because SBCK is not a tristate signal, it is always an output).

Pad 1250B is used to provide SBST in SBI mode, and is SSBI_DATA1 in SSBI mode. The pad input (PI) is delivered as SSBI_DATA_IN to SSBI master 1110B. The pad output comes through mux 1230B, and is SSBI_DATA_OUT from SSBI master 1110B in SSBI mode, and SBST from SBI master 1220 in SBI mode. The output enable (OE) comes through mux 1240B, and is SSBI_DATA_OE from SSBI master 1110B in SSBI mode, and set to high during SBI mode (because SBST is not a tristate signal, it is always an output).

Pad 1250C is used to provide SBDT in SBI mode, and is SSBI_DATA2 in SSBI mode. The pad input (PI) is delivered as SSBI_DATA_IN to SSBI master 1110C, as well as SBDT_IN to SBI master 1220. The pad output comes through mux 1230C, and is SSBI_DATA_OUT from SSBI master 1110C in SSBI mode, and SBDT_OUT from SBI master 1220 in SBI mode. The output enable (OE) comes through mux 1240C, and is SSBI_DATA_OE from SSBI master 1110C in SSBI mode, and is SBDT_OE from SBI master 1220 during SBI mode.

The interface to a microprocessor, or other device issuing access requests, is not shown. Each SSBI master 1110 and SBI master may be equipped with an interface for performing read and write accesses through the respective SSBI or SBI interface. In alternate embodiments, multiple devices may share an interface with an SBI or SSBI master, and thus an arbiter may be deployed to arbitrate accesses between the multiple devices (not shown).

In an alternate embodiment, an SSBI master may be deployed to support both SBI and SSBI protocols, with 1-wire or 3-wire support, as desired. While such an embodiment is not detailed, those of skill in the art will readily adapt the embodiments described herein to perform this support, if desired.

The master device 220 depicted in FIG. 12 is one example of a device suitable to migrate from 3-wire techniques to single wire techniques. Master device 220 is capable of communicating with legacy 3-wire slave devices, using the SBI protocol. It is also capable of performing SSBI communications with up to 3 different single-wire slave devices, such as slave device 230 shown in FIG. 13. If desired, an SSBI master 1110 may be modified to support all or part of the SBI protocol, as desired, for compatibility with other devices.

One technique for migrating from a 3-wire SBI interface to a single wire interface for a slave device 230 is depicted in FIG. 14. In this embodiment, an SBI slave 1410 (which may be a new design, or may be any SBI compatible device already designed) is coupled with SSBI slave converter 1420. Accesses are performed (writes to or reads from) the slave device 230 via an interface with SBI slave 1410 (not shown). SBI slave device 230 communicates using 3 wires, and the SBI protocol. The 3 wires are intercepted by the SSBI slave converter 1420, which performs conversion required to allow single-wire communication. In this example, 3-wire communication is also supported, so that this slave 230 may communicate with either an SBI or SSBI master. Example SSBI slave converter embodiments are detailed below, and others will be apparent to those of skill in the art in light of the teachings herein. In alternate embodiments of slave devices 230, an SSBI slave may be designed to support both protocols. One advantage of designing a converter 1420, as shown in FIG. 14, is that an existing slave device 230 may already be designed with a 3-wire interface, and to speed time to market with a new single-wire interface, a converter may be simply inserted into the device without the need to redesign the existing core.

In the slave device 230 of FIG. 14, the SBCK input is received via pad 1430 and delivered to SBCK_IN of SSBI slave converter 1420. The SBST input is received via pad 1440 and delivered to SBST_IN of SSBI slave converter 1420. These inputs are used for SBI communication, and may be used to enable SSBI mode otherwise (as detailed further below). Pad 1450 receives and transmits SBDT in SBI mode or SSBI_DATA in SSBI mode. The pad input (PI) connection to pad 1450 is connected to both SSBI_DATA on SSBI slave converter 1420 and SBDT_IN of SBI slave 1410. The pad output (PO) and output enable (OE) connections to pad 1450 come from SBDT_PO_OUT and SBDT_OE_OUT of SSBI slave converter 1420, respectively. SSBI slave converter 1420 also receives a clock input, CLK, at SSBI_CLK, and a reset signal RESET. These signals may be generated internally to slave device 230, or may be generated externally.

SSBI slave converter 1420 generates and receives SBI signals for interfacing with SBI slave 1410. SBCK_OUT and SBST_OUT are generated and connected to SBCK and SBST of SBI slave 1410, respectively. SBDT_PO and SBDT_OE are intercepted and received at SSBI slave converter 1420 as SBST_PO_IN and SBDT_OE_IN, respectively.

This example embodiment SSBI slave converter 1420 also generates other miscellaneous signals. SSBI_MODE indicates, when asserted, that the slave device 230 is operating in SSBI mode. Otherwise, the slave device is operating in SBI mode. This signal is used for conversion, detailed further below, and is delivered as an output for optional use by external blocks. Signals for managing clock disabling are also generated, which may be used to disable and enable one or more clocks, for power savings, or other purposes. The signal TCXO_DIS is asserted to disable a clock. The signal RESET_TCXO_DIS is asserted to reenable the clock. Example embodiments illustrating the use of each of the signals depicted in FIG. 14 are detailed further below.

An SSBI Slave Converter block 1420 may determine whether the slave is in 1-wire or 3-wire mode, in order to mux between these modes. Mode determination may be performed by examining SBCK and SBST from the pads (i.e. pads 1430 and 1440). In 3-wire mode, there is never a condition where SBST=1 and SBCK=0, hence that condition may be used to assert SSBI_MODE which controls SBI/SSBI muxing. As mentioned above, in this example, SSBI_MODE is also output from the SSBI slave converter 1420 in case it is needed for various other purposes. Example embodiments illustrating this functionality are detailed below.

A slave device 230, as shown in FIG. 14, may be used for either 1-wire or 3-wire communication, as described above. In an example embodiment, this slave device 230 may be configured to support only single wire SSBI communication. FIG. 13 depicts a slave device consisting of an SSBI slave 1310 that is used solely for SSBI communication. FIG. 15 depicts a configuration in which a slave device 230, comprising an SBI slave 1220 and an SSBI slave converter 1420, as depicted in FIG. 14, may also be deployed for SSBI mode only. In this example, the SBCK input may be tied to ground. The SBST may be tied high. This will indicate to the SSBI slave converter 1420 to remain in SSBI mode. Note that no mode pin or other selection device is needed. SSBI_DATA may then be directly connected to the joint SBDT/SSBI_DATA pad, and SSBI communication may then be carried out.

FIG. 16 shows another embodiment, essentially performing the same as shown in FIG. 15. In this example, however, the pins for SBCK_IN and SBST_IN may be removed (i.e. pads 1430 and 1440 are removed, or deployed for other purposes). Internally to slave device 230, the SBCK input to SSBI slave converter 1420 is tied low, and SBST is tied high. Thus, a combination 1-wire/3-wire slave may be designed, and with these simple modifications, the extra pins for SBI mode are not needed. The remaining connections are identical to those described with respect to FIG. 14.

A variety of techniques may be used to perform 1 wire to 3 wire conversion. The SSBI Slave Converter block 1420 examines the SBDT data stream and generates SBCK and SBST therefrom. Various example embodiments, detailed below, illustrate techniques for performing this conversion. Among others, three issues may arise with conversion. First, the data rates of the 1-wire scheme should be matched with the 3-wire scheme. Second, a variable number of register reads and writes in one transfer may be supported. Third, slave SBI blocks may need to be effectively reset during a multiple access transfer.

For the first issue, if the 1-wire and 3-wire schemes adopt the same data rate, the issue is resolved transparently. Otherwise, buffers may be deployed to accommodate variance in the rates between the two schemes. Those of skill in the art will recognize how to perform the correct buffering in various embodiments, and such buffering is not detailed further herein. In example embodiments described below, a common rate is shared between SBI and SSBI interfaces, although other alternate embodiments are envisioned.

For the second issue, 3-wire SBI protocols use SBST to denote the start and end of a transfer, thus a given transfer may contain one or many register reads and writes. With a 1-wire bus, it is necessary to inform the slave when the last register access of a multi-access transfer is completed. In one embodiment, a header may be added to each transfer specifying how many register accesses to expect. This may introduce overhead. In an alternate embodiment, a termination symbol may be sent after the final register access is done. This also adds overhead, but the overhead may be less than with a header. In embodiments detailed below, a termination symbol will be deployed to resolve the second issue. When the termination symbol is seen by a receiver, it knows the transfer has ended and can enter the idle state and wait for the next start bit. Such a termination symbol will be optionally inserted when used for this mode of operation, specifically when interfacing with a slave that needs to support both 3-wire and 1-wire protocols. The termination symbol need not be deployed in alternate configurations.

A termination symbol needs to be unique from the regular data stream. In this example embodiment, the termination symbol is defined as a sequence of high and low values that alternate every clock cycle for 4 cycles. In example embodiments detailed herein the sequence is 1 0 1 0, but alternate sequences will be apparent to those of skill in the art. Because the signal alternates each clock cycle in a termination sequence, instead of every two clock cycles in ordinary communication, it is distinguished uniquely from anything else in the data stream. Hence, the termination sequence ("T") may be sent at any time. Example receiver circuitry for detecting the termination symbol is detailed below with respect to FIG. 34, which illustrates the waveform on the data line including the termination symbol.

For the third issue, a slave SSBI block waits for the termination symbol to determine when the transfer is done. Thus, it is possible for the master and slave to get out of sync when the master goes into idle mode while the slave is in the middle of a transfer. In such a situation, the slave remains indefinitely in this state until the end of the next transfer the master initiates. So, to force the slave into the idle state more quickly, an option will be provided to arbitrarily transmit termination symbols. This technique is illustrated in detailed embodiments below.

SSBI Master

In any embodiment including an SSBI master, one or more SSBI master blocks 1110 may be deployed. The SSBI masters 1110 may be identical, or one or more of them may be customized in some way. In this section, an example SSBI master block 1110 is described. The ports for this example are detailed in Table 2. Timing diagrams for write and read procedures are detailed in FIGS. 17 and 18, respectively. The interrelationship between the clocks in a master and slave device is depicted in FIG. 19. FIGS. 20-22 detail portions of example logic suitable for deployment in the example SSBI master 1110. It will be clear to those of skill in the art that these example embodiments serve as illustrations only, and various alternatives will be clear in light of the teaching herein.

An example SSBI Master may have the following properties: It may operate with a pad (i.e. 1120) for SSBI_DATA with a keeper to ensure the signal does not float and a pull-down device that may be enabled (details not shown). Modifications for alternate pad configurations will be apparent to those of skill in the art. A status bit may be provided to allow software to determine if the current SSBI transaction has completed or not. For reads, the transaction may not be considered completed until the requesting logic or software application has read the returned data. A mode may be provided such that an SSBI command may be held off until a hardware enable signal asserts, or else takes effect immediately if the enable signal is already asserted. This may be useful when a read or write is to be performed at a known time. For example, measurements of a slave device may be performed when the slave device is in a consistent state. An output signal indicating when a write has occurred may be provided. Thus, the requesting logic or application may use the knowledge of the completed write to perform subsequent actions. This may be useful when configuring slave devices such as RFICs that may need calibration, for example.

The SSBI master 1110 is responsible for converting a read or write request into the signaling on the 1-wire SSBI bus. This block is also responsible for de-serializing read register data from the SSBI bus. An optional SSBI arbiter block (not shown) may be deployed for arbitrating requests from multiple controlling parties (called hosts). An arbiter may take requests from the hosts using the same signaling expected by the SSBI master 1110. An arbiter may perform arbitration, allowing the winner's request to go through while stalling requests from the other hosts. Depending on the host type, different logic may be used. The SSBI master 1110 may be used to provide an interface by which a host, i.e. a microprocessor, can program accesses with the SSBI through software. A system deployed with three hosts, for example, may be deployed using the building blocks of an arbiter and one or more SSBI masters, while a system only requiring one host may be deployed without an arbiter and the host may interface directly with the SSBI Master bus interface.

As one example of the flexibility with which embodiments may be deployed, a hardware parameter, SSBI_DATA_WD, is defined for parameterizing various SSBI blocks. The read/write timing waveforms described in FIGS. 17-19, 24-25, 28, 33-34, and related figures correspond to SSBI_DATA_WD=8.

FIGS. 17-22 illustrate one example SSBI master 1110 embodiment. This embodiment is suitable for deployment when only the native SSBI formats need to be supported. Various modifications may be made for various alternate embodiments. Modifications to this embodiment are detailed for supporting FTM transfers (an example of a legacy SBI format) over the SSBI bus are described in an alternate embodiment, detailed with respect to FIGS. 28-31, below.

As described above, one or more of various types of hosts may interface with an SSBI master 1110, with one or more arbiters and other interface logic for communication therewith. In one example embodiment, one or more of the hosts may be a microprocessor, DSP, other general or special purpose processor, or any other logic deployed for such interface. Input and output signals and/or commands are defined for clarity of illustration below, as shown in Table 2. These input and output signals and commands are detailed further below, along with example embodiments for producing or responding to them. Those of skill in the art will recognize various alternative interface designs that may be deployed. As various hosts, such as microprocessors, may have varying interfaces for performing accesses such as writes, reads, and returning status results and signals, one of skill in the art may readily modify the interface illustrated, or determine appropriate logic for interfacing with one or more hosts of various types. These details are omitted in the following discussion for clarity. As general examples, a host may interface with an SSBI master using any combination of read, write, data, address, and other signals to generate commands and set parameters. Writing to or reading from pre-defined registers, or bit locations therein, may be used for setting parameters or issuing commands, a technique well known in the art.

The SSBI master 1110 interfaces with the SSBI bus. It receives signals describing the SSBI command to perform, then generates or monitors the serial SSBI data stream. This example SSBI master is ambivalent about how many entities (i.e. hosts) may initiate SSBI commands, and any desired arbitration or muxing is dealt with external to this block. In this example, the SSBI master idles until it receives an access request or other command. It then asserts an acknowledge line, performs the transaction, and, upon completion of the access, generates a pulse on a done line, indicating that it is ready to start the next access. For both reads and writes, the acknowledge signal will pulse when the transaction has been sampled and is starting. Whatever logic (i.e. host) made the request may then change the register information (address, data, etc.) to prepare for the next request and may assert the request line again if desired. When the first access is completed, the done signal asserts. While a write command may not require monitoring the done signal, unless that information is useful for some portion of the requesting application, the done signal is useful for sampling the returned data for reads.

TABLE 2

SSBI Master Port Descriptions

| Port | Direction | Description |
|---|---|---|
| SSBI_CLK | Input | Clock |
| RESET | Input | Synchronized version of a reset signal |
| SSBI_DATA_DEL[1:0] | Input | Specifies amount of delay of SSBI_DATA_IN in ½ clock units |
| IDLE_SYMS[1:0] | Input | Specifies minimum number of idle symbols between back to back transfers |
| SEL_RD_DATA[1:0] | Input | Specifies which RD_DATA value to select |
| REQ | Input | Request asserts to inform interface to perform a read or write, remains high until ACK asserts |
| READ | Input | Control signal indicating a request is to perform a read |

TABLE 2-continued

SSBI Master Port Descriptions

| Port | Direction | Description |
|---|---|---|
| ADDR[7:0] | Input | Slave register address for transfer |
| WR_DATA [SSBI_DATA_WD-1:0] | Input | Write data for slave register |
| OVR_VALUE | Input | Value to be driven on SSBI_DATA in override mode |
| OVR_MODE | Input | Control signal to enable override mode |
| SSBI_DATA_PDEN | Input | Pulldown enable for SSBI_DATA pad; asserted on reset; deasserted by subsequent command to carry on normal SSBI activity |
| SSBI_DATA_IN | Input | SSBI_DATA input |
| SSBI_DATA_OUT | Output | SSBI_DATA output |
| SSBI_DATA_OE | Output | Output enable for SSBI_DATA pad |
| RD_DATA [SSBI_DATA_WD-1:0] | Output | Read data returned by slave register |
| ACK | Output | Pulses when the SSBI transaction has been accepted and will start |
| DONE | Output | Pulses when the SSBI transaction has been completed; may be used to sample RD_DATA for reads |
| STATE_INV | Output | Inverse of STATE signal |
| READ_REQ_SERVED | Output | Set for duration read request is being served |

Timing diagrams for writes and reads are shown separately in FIG. 17 and FIG. 18, respectively. The discussion corresponding to these figures may be applied to the example embodiment detailed further below with respect to FIGS. 20-22. For both access types, a merged SSBI_DATA bus is shown instead of separate SSBI_DATA_IN and SSBI_DATA_OUT. In an example configuration of pad circuitry, anything on SSBI_DATA_OUT will appear on SSBI_DATA_IN. For writes, SSBI_DATA_IN will be ignored. For reads, SSBI_DATA_OUT is driven onto the SSBI_DATA pad only when SSBI_DATA_OE is asserted. The waveform for SSBI_DATA uses the notation RW to denote the read/write bit (1 is read, 0 is write, in this example), A7 to A0 for the address bits, D7-D0 for the data bits (SSBI_DATA_WD=8), and P for the pause bit. Note that alternate embodiments may include smaller or larger address spaces, as well as different data widths (i.e. SSBI_DATA_WD not equal to 8).

The SSBI master resets into an Idle state (indicated on the STATE line) and remains there until it sees REQ assert. The SSBI master then samples the other input signals, asserts ACK, and generates the serial data stream output onto SSBI_DATA. At the end of the access, DONE is pulsed to indicate the conversion is complete. Once ACK asserts, starting in the following clock cycle, REQ can be asserted for the next access. That access will be held off until the current one completes. In this example, REQ, ADDR, WR_DATA (for a write) and READ will reflect the parameters for a next access until ACK asserts for that access (after which the parameters may change for a subsequent access). In FIGS. 17 and 18, the second access (REQ and ACK) is shown dotted. If the second request is made before the first one completes, the SSBI master may start the next transfer without any intervening idle symbols. A slave should not need to see a low to high transition to detect the start symbol. It should be content to sample the start symbol without a prior idle symbol, hence the SSBI master may be designed to support this option. However, in this embodiment, a software programmable parameter, IDLE_SYMS, is defined to insert 1 to 3 idle symbols in between each transfer, as desired.

In FIG. 17, when REQ asserts, ADDR, WR_DATA and READ are sampled into a shift register (i.e. shift registers 2130 and 2140, and flip-flop 2110) along with a start bit. STATE becomes SAMPLE (1), and STB begins toggling. STB acts as a counter enable causing BITCNT to count symbols transmitted. All 18 bits of the transfer (the start bit+READ+ADDR+DATA) are shifted by the shift register every other clock cycle. During the second half of the last symbol (D0), DONE is pulsed. Another signal introduced below, DONE_DELX (not shown in FIG. 17) may pulse at this time as well, or it may pulse IDLE_SYMS symbol periods later. If there is no outstanding request, DONE_DELX resets STATE to Idle (0) and the SSBI master waits for the next assertion of REQ. If there is an outstanding request, the REQ signal is effectively observed during the same cycle DONE_DELX asserts, causing ACK to assert in the subsequent cycle, and keeping STATE at SAMPLE (1). Such a transfer continues as described for the first transfer.

FIG. 18 illustrates a read operation. The block performs the same steps as for writes except that SSBI_DATA_OE de-asserts once A 0 has been transmitted. The connected slave device then has control of the bus to return slave register data. Once the slave has returned such data, there is another pause bit, after which the master may drive the bus again. The read bits enter a shift register (i.e. shift registers 2130 and 2140), which is relatched in the cycle preceding DONE assertion. This performed this way in this example to prevent RD_DATA from toggling unnecessarily, since RD_DATA may be feeding large clouds of muxing or other logic. Logic receiving RD_DATA may sample it using DONE as the enable. Subsequent requests may be handled in similar fashion as for writes, described above.

One consideration is the time at which the SSBI master should sample the SSBI_DATA bus for the read bits. In the ideal case, the SSBI_DATA bus should appear to the master as shown in FIG. 18. There may be various factors at work to prevent this ideal situation though: for example, sampling uncertainty at the receiver due to blind phase detection, as well as various delays including pad, board, and internal chip delays.

FIG. 19 illustrates these phenomena. The top waveform shows SSBI_CLK at the SSBI master. The second pair of waveforms illustrates what SSBI_DATA looks like at the master and slave devices assuming no delays. The third set of waveforms show what happens when there is ½ of an SSBI_

CLK cycle of delay in each direction. The effect is that the read data may appear on SSBI_DATA at the master device one full clock period later than in the case where there are no delays. In addition, the example slave device will sample the symbols somewhere between 25-75% into its clock period. As a result, there is uncertainty in sampling the data at the right time on the master side.

In the example embodiment, some flexibility is added in the SSBI master to mitigate against these effects. There are two software-programmed features that allow for a robust system able to handle delays up to 3 clock periods.

The first feature is delaying SSBI_DATA_IN. As discussed above, the sampling uncertainty at the slave device may not be adjusted for at the master device, assuming true blind phase detection. However, the delays for a given SSBI port will be relatively fixed in a given system deployment. As a result, if there is very little delay, the sampling point may be pulled in earlier. With relatively large delays, the sampling point may be pushed out. To accomplish this easily in the example SSBI master, flexibility is added to delay the incoming SSBI_DATA_IN signal by 0, 0.5, 1 or 1.5 clock periods. Then for all cases, the delayed version of SSBI_DATA_IN will be sampled in FIG. 18 at the end of the symbol periods. In any given deployment, other delays (including fewer or greater choices) may be used (i.e. 0.5 and 1.5 cycles only).

The second feature allows control of the BITCNT cycle in which RD_DATA returned by the slave device is captured. In FIG. 18, it is shown that RD_DATA is available in cycle 19. However, the data may also be captured in a cycle later then 19. The time when the SSBI master again takes control of the SSBI_DATA line may also be adjusted so as to give time for RD_DATA to be ready. This feature is controlled based on the parameter SEL_RD_DATA. For example, when SEL_RD_DATA=00, the numbers in bold in FIGS. 20 and 22, detailed below, are used as shown. When SEL_RD_DATA=01, these numbers are incremented by 1.

These settings may be selected using a variety of techniques. One technique is for the designer to carefully look at the timing and understand the various delays. Alternatively, a trial and error approach may be adequate. For example, a procedure may simply read a slave register expecting a particular value, then adjust the setting if the value returned is incorrect.

FIGS. 20-22 illustrate example circuitry suitable for deployment in an example SSBI master 1110. Various modifications and alternatives will be apparent to those of skill in the art in light of the teaching herein. The top of FIG. 20 illustrates logic for delaying SSBI_DATA_IN based on SSBI_DATA_DEL. SSBI_DATA_IN_DEL is generated as follows. SSBI_DATA is fed into flip-flops 2010 and 2030. Note that all clocked devices in FIGS. 20-22 are clocked by SSBI_CLK, or its inverse (shown with the conventional notation of a bubble in front of the clock input). Note that flip-flop 2010 is clocked with the inverse of SSBI_CLK, and flip-flop 2030 is clocked with SSBI_CLK directly. The output of flip-flop 2010 is directed to the input of flip-flop 2020. SSBI_DATA_IN is delivered to one input of mux 2040, as are the outputs of flip-flops 2010-2030. SSBI_DATA_DEL is used to select one input of mux 2040 as the output, or SSBI_DATA_IN_DEL.

Below, in FIG. 20, is logic for generating DONE_DELX based on IDLE_SYMS. In this example, DONE_DELX is formed in logic 2050 as the AND of STB and the OR of (NOT SREAD AND BITCNT=17+IDLE_SYMS) and (SREAD and BITCNT=19+IDLE_SYMS). Recall that numbers in bold correspond to SEL_RD_DATA=0, and the numbers may be modified for other values, as described above.

FIG. 21 shows the entire shift register chain described above with respect to FIGS. 17 and 18. Starting at the lsb, this chain is composed of a SSBI_DATA_WD bit shift register 2140, a 9-bit shift register 2130 and a single register (or flip-flop) 2110 that drives SSBI_DATA_OUT. In this example, the one bit register 2110 is initially pre-loaded with the start symbol. The signal REQP is used to latch the request information into the shift register chain. The 9-bit shift register 2130 is pre-loaded with the read/write bit and the address bits (the & indicates concatenation). The SSBI_DATA_WD bit shift register 2140 is pre-loaded with write data for write operations or all 0's for read operations. The 0's ensure that at the end of a read operation, a 0 ends up in the one bit register 2110 feeding SSBI_DATA_OUT, which is used for the Idle state in this example. The signal STB is used to enable the shift register chain to shift. During a transfer, STB will assert every other clock cycle (detailed further below).

The shift input to shift register 2140 is determined as the output of mux 2150, which selects a 0 when SSBI_DATA_OE is asserted, and SSBI_DATA_IN_DEL otherwise. The parallel output of shift register 2140 may be made available as RD_DATA_PRE. The shift output of shift register 2140 is connected to the shift input of shift register 2130. The shift output of shift register 2140 encounters additional logic in this example, to illustrate another optional feature. An override mode is defined to allow the value indicated by parameter OVR_VALUE to override the OR 2120 of the shift output of shift register 2130 with REQP (used in normal SSBI operation) when OVR_MODE is asserted, which, in this example, is selected in mux 2160. The output of mux 2160 is delivered to the input of flip-flop 2110 (shown as a flip-flop resettable by RESET). The output of flip-flop 2110 produces SSBI_DATA_OUT.

FIG. 22 illustrates additional control logic for SSBI master 1110. Once STATE is 1 (the output of Set/Reset (SR) flip-flop 2220), the counter 2228 for generating BITCNT is enabled. For writes, the shift register chain (2110, 2130, and 2140) is enabled every other clock cycle until all the data goes out, while 0's are shifted into the chain. For reads, the start symbol and address bits are shifted out, while 0's are shifted in. However, when it is time to sample incoming read data, SSBI_DATA_IN_DEL is sampled by the SSBI_DATA_WD bit shift register 2140 used for write data. Once all bits of the read data have been shifted in, they are available on RD_DATA_PRE and relatched in register 2208 to generate RD_DATA in the cycle before the DONE assertion. This enable is formed as the AND of SREAD, NOT STB, NOT RESET, and BITCNT=19.

STATE is generated as the output of SR flip-flop 2220. The set input to SR flip-flop 2220 is formed as the AND 2216 of REQP and NOT RESET. The reset input to SR flip-flop 2220 is formed as the OR 2218 of DONE_DELX and RESET.

STB (also labeled as CNT_EN) is formed as the output of resettable flip-flop 2224. The input to this flip-flop is the inverse 2226 of its output, thus the creation of STB alternating every clock cycle when the flip-flop is not being reset. The reset input is formed as the OR 2222 of REQP and NOT STATE.

BITCNT (a 5-bit signal in this example, alternate embodiments may provide different parameters requiring alternate values throughout FIGS. 20-22) is formed as the output of counter 2228. The reset of counter 2228 is identical to the reset of flip-flop 2224. The enable of counter 2228 is CNT_EN (or STB), which allows for counting during a transmission or reception, as described above.

SREAD is formed as the output of flip-flop 2210, which is reset via signal RESET. Flip-flop 2210 is enabled with REQP. The D input to flip-flop 2210 is READ.

In this example, a signal READ_REQ_SERVED is generated for use by other logic as the AND 2230 of SREAD and STATE.

REQP is formed as the AND 2204 of REQ and the OR 2202 of NOT STATE (STATE_INV) and DONE_DELX. REQP is delayed by a clock cycle in flip-flop 2206 to produce ACK.

In this example, upon reset, STATE and SSBI_DATA_OUT will synchronously clear. SSBI_DATA_PDEN asynchronously sets causing SSBI_DATA_OE to go low. In this example, when a software application initiates some SSBI activity, it writes to a control register, or uses some alternate signaling technique, to reset the SSBI_DATA_PDEN bit. This changes SSBI_DATA_OE to '1' and the SSBI master 1110 starts driving '0' on SSBI_DATA (as detailed above). Thus, SSBI_DATA_OE is formed as the AND 2214 of NOT SSBI_DATA_PDEN and the output of flip-flop 2212. Flip-flop 2212 is reset with RESET. Flip-flop 2212 is enabled by STB. The D input to flip-flop 2212 is formed by the OR of BITCNT<9, BITCNT>=19, and NOT SREAD.

Again, recall that numbers in bold correspond to SEL_RD_DATA=0, and the numbers may be modified for other values, as described above. All the registers in FIG. 22 are clocked with SSBI_CLK.

SSBI Slave

FIG. 23 depicts an example embodiment of SSBI slave 1310. Example SSBI slave bus interface port descriptions are detailed in Table 3. In this example SSBI slave bus interface 2310 is connected with slave registers block 2320. The single wire SSBI data bus is connected with a pad (not shown), and incoming data is delivered to SSBI slave bus interface 2310 on SSBI_DATA_IN. Outgoing data is delivered on SSBI_DATA_OUT, with the directionality of the pad controlled via SSBI_DATA_OE. The SSBI_CLK signal is delivered as a clock to SSBI slave bus interface 2310. Slave registers block 2320 may also receive SSBI_CLK, but it is optional (an optional mechanism for determining whether or not the SSBI_CLK is operational is detailed below). Slave register accesses are made between SSBI slave bus interface 2310 and slave registers 2320 via the ADDR, WR_STB, WR_DATA, and RD_DATA signals. The outputs of the slave registers are delivered for use by the slave device 230. Read values from the slave device 230 are delivered to slave registers 2320 for access via the SSBI bus.

The SSBI Slave Bus Interface 2310 is responsible for doing serial to parallel conversion on the 1-wire bus signal and converting it into a read or write request. This request is sent to slave registers block 2320, which contains the write registers and is responsible for muxing read registers. This example configuration is one embodiment that has the advantage that the SSBI slave bus interface 2310 may be designed to be identical for various slave designs, while logic that is particular to a slave is deployed in slave registers block 2320. Various alternatives may also be deployed.

SSBI slave bus interface 2310 examines the SSBI_DATA line for the start symbol, which denotes the start of a transfer. It then looks at the first symbol to determine if it is a read or write, then scans in the address bits. Once all the address bits are scanned in, they are fed out as ADDR to the slave registers block 2320. For a write, the data bits are shifted in and then fed as WR_DATA to the slave registers block 2320 along with a strobe, WR_STB. WR_STB is used by the slave registers block 2320 to sample the address (ADDR) and data (WR_DATA) fields. For a read, after ADDR is passed to the slave registers block 2320, during the pause bit the SSBI read register data (RD_DATA) is sampled by the SSBI slave bus interface 2310 and then shifted out bit by bit onto the SSBI bus. Once a single transaction is complete, the SSBI slave bus interface 2310 awaits the next start bit.

In this example, multiple transactions terminated with a termination symbol (such as BTM, described above) are disallowed. This configuration provides simplified design (less hardware, fewer cases to test), and is suitable for deployment when there is little advantage to allowing multiple transfers, i.e. the overhead for an individual transfer is relatively small. Alternate embodiments may allow for multiple transactions terminated with a termination symbol.

In alternate embodiments, other versions of the SSBI slave bus interface 2310 may be deployed. One difference may be in the number of output ports. A configuration may have one set of ADDR, WR_STB, WR_DATA, and RD_DATA, or additional sets of these signals. By including additional sets, multiple banks of read and/or write registers may be accessed independently. Another option is to have either a bidirectional databus or separate buses for read and write data. Various other alternatives will be apparent to those of skill in the art. For clarity of discussion, the example embodiments detailed below will comprise a single set of ADDR, WR_STB, WR_DATA, and RD_DATA, with separate buses for read and write data.

TABLE 3

SSBI Slave Bus Interface Port Descriptions

| Port | Direction | Description |
| --- | --- | --- |
| SSBI_CLK | Input | Clock |
| RESET | Input | Synchronized version of a reset signal |
| SSBI_DATA_IN | Input | SSBI_DATA input from chip pad |
| SSBI_DATA_OUT | Output | SSBI_DATA output to chip pad |
| SSBI_DATA_OE | Output | Output enable for SSBI_DATA pad |
| ADDR[7:0] | Output | Latched SSBI address |
| WR_STB | Output | Write strobe; May be used as clock for SSBI write registers |
| WR_DATA | Output | Latched SSBI register write data |
| Port | Direction | Description |
| [SSBI_DATA_WD-1:0] | | |
| RD_DATA | Input | Muxed SSBI register read data; sampled before ADDR changes |
| [SSBI_DATA_WD-1:0] | | |
| TCXO_DIS | Input | '0' in normal operation; '1' when SSBI_CLK is off; may be stored in a slave register |
| RESET_TCXO_DIS | Output | Used to reset TCXO_DIS register bit |

Writes and reads are shown separately in FIG. 24 and FIG. 25, respectively. The discussion corresponding to these figures may be applied to the example embodiment detailed further below with respect to FIGS. 26-27. The read/write timing is described for the case when SSBI_DATA_WD is 8. Alternatives for SSBI_DATA_WD are described with respect to FIGS. 26-27. For both access types, a merged SSBI_DATA bus is shown instead of separate SSBI_DATA_IN and SSBI_DATA_OUT. In an example configuration of pad circuitry, anything on SSBI_DATA_OUT will appear on SSBI_DATA_IN. For writes, SSBI_DATA_IN will be ignored. For reads, SSBI_DATA_OUT is driven onto the SSBI_DATA pad only when SSBI_DATA_OE is asserted. The waveform for SSBI_DATA uses the notation RW to denote the read/write bit (1 is read, 0 is write, in this example), A7-A 0 for the address bits, D7-D0 for the data bits, and P for the pause bit. Note that alternate embodiments may include smaller or larger address spaces, as well as different data widths (i.e. SSBI_DATA_WD not equal to 8).

In FIG. 24, when the start bit is found, FOUND_ST goes high. It is generated through logic that, when STATE is Idle (0), simply samples SSBI_DATA every clock cycle until a high is found. FOUND_ST is generated a half clock cycle later to allow for metastability resolution. FOUND_ST causes STATE to become Sample (1), which in turn allows STB to toggle. STB, in turn, causes BITCNT to increment. STB is used as an enable to sample the symbols into the shift register (i.e. 2628). The shift register has a number of bits indicated by INPUT_DATA_SIZE. This constant has a value that is the larger of 8 or SSBI_DATA_WD. BITCNT (i.e. 2646) keeps track of how many bits have been sampled. Once all the address bits are latched in (denoted by BITCNT=8), the contents of the shift register are relatched (i.e. 2634) and output onto ADDR. This relatching is optional, the purpose of which is to conserve power in the Slave registers block, since ADDR will potentially feed a reasonably large amount of mux logic. Similarly, once all the data bits are latched in (denoted by BITCNT=16), the contents of the shift register are relatched (i.e. 2636) and output onto WR_DATA. WR_STB is pulsed so the slave registers block 2320 knows to perform the write. DONE asserts when BITCNT=17, to reset STATE to Idle (0), so the process may repeat if needed.

FIG. 25 illustrates a read operation. The block performs the same steps as for writes through to outputting the address on ADDR. Not shown in the previous figure, RD_DATA may be muxed based on ADDR, so even for writes, RD_DATA may potentially change when ADDR changes, even though it is ignored. During the BITCNT=9 cycle, RD_DATA is sampled into a shift register (i.e. 2660), and shifted bit by bit onto the SSBI_DATA_OUT line. SSBI_DATA_OE asserts to indicate when to drive data onto the SSBI_DATA pad and remains high until all the data has been shifted onto the bus. DONE asserts when BITCNT=19, to reset STATE to Idle, so the process may repeat if needed.

Note that read data is output a full clock cycle early (½ a symbol period). This reduces the effectiveness of the pause bit between the address and read data. In this case, there is one clock cycle of nonoverlap time. An advantage of this approach is that if SSBI read data is shifted out when SSBI write data would be seen, from the point of view of the master, the read data will appear late due to the round trip delay. By outputting the read data early, it will be offset by the round trip delay, making it appear closer to when the master really expects to see it.

Because of blind phase detection, there is no guarantee that SSBI_CLK will be lined up with SSBI_DATA as shown in the figures. The figures show SSBI_CLK at one extreme, perhaps the "best case". The "worst case" will be such that the start bit is found one full clock cycle later, resulting in all the signals (except SSBI_DATA) being shifted to the right by one clock cycle. This does not introduce a problem. Instead of sampling the symbols 25% into the symbol period, they will be sampled 75% into the symbol period. For reads, instead of driving SBI read data ½ symbol period early, it will be ½ symbol period late. This one cycle of variability is reduced to half a cycle, by using the LATE signal. It is generated by the circuit similar to the one for FOUND_ST (both detailed further below), except that it works on opposite clock edges. When LATE is 0, SSBI_DATA_OUT and SSBI_DATA_OE are delayed by half a clock cycle before being used. When LATE is 1, they are used as is. The circuitry associated with the LATE signal also exists for the SSBI slave converter 1420, introduced above and detailed further below with respect to FIGS. 32-35.

Another optional feature may be included such that the master device 220 may disable the slave clock by setting some slave register bit, denoted here as TCXO_DIS. When this bit is set, the slave SSBI_CLK will turn off. To enable the clock again, the master device transmits the sequence 0 to 1 to 0 to the slave. This is captured by the slave, which generates the RESET_TCXO_DIS signal. This signal resets TCXO_DIS, which in turn again enables the SSBI_CLK for the slave. This feature allows the master to put the SBI slave device in sleep mode and hence saves power (detailed further below).

FIG. 26 illustrates example circuitry suitable for deployment in an example SSBI slave bus interface 2310. Various alternatives for the control mechanisms shown may be deployed, using any combination of logic, state machines, microcode, software, and the like. In this example, BITCNT denotes the various states required. Note that the control signals depend on SSBI_DATA_WD, and may change in accordance with changes thereon.

The parameter INPUT_DATA_SIZE is computed as the maximum 2614 of 8 and SSBI_DATA_WD. In the example embodiment, both parameters are known apriori and used to generate a specific logic configuration for the selected SSBI_DATA_WD parameter. An alternate embodiment may be deployed to accommodate programmable values for SSBI_DATA_WD. Thus, for example, the bit selections for the inputs to registers 2632-36 may include logic before and after to accommodate programming changes. Another option is to have a programmable ADDR size, with similar changes for accommodating different values of ADDR. These details are not shown. Those of skill in the art will readily adapt these and other options in light of the teaching herein. For clarity of discussion, the following assumes a set SSBI_DATA_WD and INPUT_DATA_SIZE for a given deployment.

Note that all clocked devices in FIG. 26 are clocked by SSBI_CLK, or its inverse (shown with the conventional notation of a bubble in front of the clock input). Unless otherwise noted, the registers detailed below are clocked by SSBI_CLK.

In this example, locating the start bit is performed as follows. SSBI_DATA_IN is latched by flip-flop 2602 with inverted SSBI_CLK and by flip-flop 2610 with SSBI_CLK. The output of flip-flop 2602 is latched by flip-flop 2604 with SSBI_CLK to produce FOUND_ST_N. The output of flip-flop 2610 is latched by flip-flop 2612 with inverted SSBI_CLK to produce FOUND_ST. All four flip flops are reset by the OR (2606, 2608) of STATE and RESET_EFF. FOUND_STN is latched by flip-flop 2618 to produce LATE, enabled by the AND 2616 of FOUND_ST and NOT STATE. FOUND_ST is latched by flip-flop 2622 to produce STATE, clocked by the inverse of SSBI_CLK. Flip-flop 2622 is asynchronously reset by RESET_EFF. The enable for flip-flop 2622 is determined by the output of mux 2620, which selects DONE when STATE is asserted and FOUND_ST otherwise.

DONE is determined as the AND 2626 of STB and the OR 2624 of two inputs. The first input to OR 2624 is the AND of NOT READ and BITCNT=9+SSBI_DATA_WD. The second input to OR 2624 is the AND of READ and BITCNT=11+SSBI_DATA_WD.

SSBI_DATA_IN is shifted into shift register 2628 with the inverse of SSBI_CLK, enabled by the AND 2630 of NOT STB and STATE. The parallel output of shift register 2628 is of size INPUT_DATA_SIZE. The least significant output bit is latched in register 2632, enabled by the AND of STB and BITCNT=1, to produce READ. The 8 least significant output bits are latched in register 2634 to produce ADDR, enabled by the AND of STB and BITCNT=9. The output bits SSBI_DATA_WD-1 to 0 are latched in register 2636 to produce WR_DATA, enabled by the AND of NOT READ, STB, and BITCNT=9+SSBI_DATA_WD. This enable signal is also latched in register 2638 to produce WR_STB, asynchronously reset by RESET_EFF.

STB is formed as the output of flip-flop 2640, taking its input as NOT STB, and reset by NOT STATE. NOT STB is formed by inverter 2644 inverting STB. NOT STB is latched in flip-flop 2642 to produce NOT STB_D. The output of counter 2646 forms BITCNT, which is reset by the OR of NOT STATE and DONE, and enabled by STB.

The optional clock disabling circuit, described above, is implemented in this example as follows. TCXO_DIS is latched in flip-flop 2648, clocked by SSBI_DATA_IN. The output of flip-flop 2648 is latched by flip-flop 2650 to produce RESET_TCXO_DIS, which is clocked by NOT SSBI_DATA_IN. Both flip-flops are reset asynchronously by RESET.

RESET_EFF is formed as the output of flip-flop 2672, the input of which is the output of flip-flop 2670. The input to flip-flop 2670 is the output of flip-flop 2668, which takes a '0' as its input. All three flip-flops are asynchronously set by the OR 2666 of TCXO_DIS and RESET.

SSBI_DATA_OUT is selected via mux 2664 as the shift output of shift register 2660 when LATE is asserted. SSBI_DATA_OUT is selected via mux 2664 as the output of flip-flop 2662 when LATE is not asserted. Flip-flop 2662 takes as its input the shift output of shift register 2660, clocked by the inverse of SSBI_CLK. The parallel input to shift register 2660 is the SSBI_DATA_WD wide RD_DATA input. The shift input to shift register 2660 is a '0'. Shift register 2660 is loaded by the AND of READ, NOT STB, and BITCNT=9. Shifting of shift register 2660 is enabled by the AND 2658 of NOT STB_D, READ, and SSBI_DATA_OE_REG.

SSBI_DATA_OE is selected via mux 2656 as SSBI_DATA_OE_REG when LATE is asserted. SSBI_DATA_OE is selected via mux 2656 as the output of flip-flop 2654 when LATE is not asserted. Flip-flop 2654 takes as its input SSBI_DATA_OE_REG, clocked by the inverse of SSBI_CLK. SSBI_DATA_OE_REG is formed as the output of flip-flop 2652. The input to flip-flop 2652 is the AND of READ, BITCNT>=10, and BITCNT<=(9+SSBI_DATA_WD). Flip-flop 2652 is enabled by STB, and asynchronously reset by RESET_EFF.

FIG. 27 depicts example logic suitable for deployment as slave registers block 2320. In this example, SSBI_DATA_WD is set to 8 for illustrative purposes. Register 2710 is an example register for storing an output WR_REGxxx_DATA. It receives WR_DATA as its input, which may be clocked by WR_STB. Many write registers may be deployed, and xxx may be substituted with an appropriate identifier. Note that for a particular address, not all of the WR_DATA bits may need to be latched, and thus the corresponding storage elements may be eliminated. An enable signal for each register 2710 may be enabled according to the corresponding address, controlled by ADDR (details not shown). In an alternate embodiment, SSBI_CLK may be used as the clock, with WR_STB incorporated in an enable signal. The various WR_REGxxx_DATA outputs may be delivered to the slave device 230, as desired.

RD_DATA is formed, in this example, by the output of mux logic 2720, selected in accordance with ADDR. Various mux implementations may be deployed, such as traditional multiplexers, combinatorial logic, tri-state bus techniques, and the like. The inputs to mux 2720 are n input signals denoted RDREG0_DATA-RDREGn_DATA, and are assigned according to the corresponding address designations. These inputs may come from anywhere within the slave device 230, as desired.

SSBI Master Supporting FTM

This section illustrates an example embodiment of an SSBI master 1110 adapted to support SBI FTM mode, detailed above. FIGS. 28-31, and their corresponding descriptions, detail the changes required in the example SSBI Master described with respect to FIGS. 20-22, above, to support FTM commands over a single wire bus. This SSBI master 1110 is capable of supporting both SSBI Commands and FTM commands (the mode selected based on a configuration bit called FTM_MODE). Table 4 shows additional ports for this example embodiment, which may be combined with the ports of Table 2.

TABLE 4

Modified SSBI Master Port Descriptions

| Port | Direction | Description |
|---|---|---|
| DISABLE_TERM_SYM | Input | In FTM mode, when set, will suppress the termination symbol from being sent to the Slave at the end of transfer |
| SEND_TERM_SYM | Input | In FTM mode, pulses to send just the termination symbol to the Slave |
| FTM_MODE | Input | FTM mode enable bit |
| SLAVE_ID[5:0] | Input | Input Slave ID |

The signal FTM_MODE, when set, indicates an access will be in FTM mode. For non-FTM mode accesses, the waveforms and circuit may be similar to the non-modified circuit, described above with respect to FIGS. 17-22. At a high level, to support FTM mode, the following changes need to be made: First, the command format will match FTM mode for 3-wire mode. Second, the circuit needs to identify when a burst of transfers is completed so it can send a termination symbol. Third, IDLE_SYMS will specify the number of idle symbols in between two bursts, rather than between individual accesses.

To simplify the following description, the term access will be used to refer to an individual read or write. The term burst will be used to refer to a sequence where a slave ID is transmitted, followed by one or more accesses, then terminated by transmitting a termination symbol. Alternate embodiments may implement alternatives to the termination symbol, examples of which are given above. Thus, a burst may have one access or several. Note that in non-FTM mode, there are no bursts. All accesses are treated as single accesses.

For a burst, the first access is preceded with the transmission of the start bit, mode bits and slave ID. Subsequent accesses may be made without these transmissions. A signal CONT is defined, an example of which is detailed in FIG. 31 (as the output of flip-flop 3110), and is used to denote whether an access is the first access (0) or a later access (1). CONT asserts in the same cycle that REQP would assert for the second access and will remain asserted until the termination symbol is sent. In this way, CONT may be used to configure the shift chain correctly to bypass the start bit, mode bits and slave ID (detailed further below).

As the first access completes, CONT asserts and DONE pulses. REQ may be examined while DONE is high to determine if there is a subsequent access in this burst. If so, ACK pulses, the new parameters are latched into the scan chain as normal, except that the scan chain will be configured to bypass the mode bits and slave ID. Also, BITCNT will be pre-loaded with 10 instead of 0, since the start bit, mode bits, slave ID and first pause bit are skipped. DONE asserts for each access as it completes.

At the end of a burst (whether it includes one transfer or a bunch of transfers), a termination symbol needs to be output. TERM asserts for the duration the termination symbol is sent. During this time, BITCNT needs to increment every cycle instead of every other cycle and the pattern output is 1010. Alternate embodiments may utilize alternate termination symbol patterns. Once the termination symbol has been sent, an internal "done" signal, DONE_DELX, needs to be generated and delayed according to IDLE_SYMS such that the next burst can start when available. FIG. 28 illustrates the waveforms showing the end of an example burst. Note that, in this example embodiment, STB pulses twice during the termination symbol, although it may be ignored by the circuit (detailed further below).

FIGS. 29-31 illustrate example circuitry suitable for deployment in an example SSBI master 1110, modified to support FTM mode. Various other modifications and alternatives will be apparent to those of skill in the art in light of the teaching herein.

FIG. 29 illustrates the modified logic dependent on the configuration parameters. SSBI_DATA_IN_DEL generation is the same as in the original circuit. DONE_DELX generation differs based on FTM_MODE. In FTM_MODE, this signal pulses at the end of a burst. Since at that time, BITCNT increments every clock cycle, STB can be ignored.

As in FIG. 20, the top of FIG. 29 illustrates logic for delaying SSBI_DATA_IN based on SSBI_DATA_DEL. SSBI_DATA_IN_DEL is generated just as in FIG. 20. SSBI_DATA is fed into flip-flops 2010 and 2030. Note that all clocked devices in FIGS. 20-22 are clocked by SSBI_CLK, or its inverse (shown with the conventional notation of a bubble in front of the clock input). Note that flip-flop 2010 is clocked with the inverse of SSBI_CLK, and flip-flop 2030 is clocked with SSBI_CLK directly. The output of flip-flop 2010 is directed to the input of flip-flop 2020. SSBI_DATA_IN is delivered to one input of mux 2040, as are the outputs of flip-flops 2010-2030. SSBI_DATA_DEL is used to select one input of mux 2040 as the output, or SSBI_DATA_IN_DEL.

Again, DONE_DELX is based on IDLE_SYMS. As in FIG. 20, logic 2050 produces AND of STB and the OR of (NOT SREAD AND BITCNT=17+IDLE_SYMS) and (SREAD and BITCNT=19+IDLE_SYMS). Mux 2910 is added to produce DONE_DELX. DONE_DELX is selected as the output of logic 2050 when FTM_MODE is not asserted, and as BITCNT=31+IDLE_SYMS when FTM_MODE is asserted. Recall that numbers in bold correspond to SEL_RD_DATA=0, and the numbers may be modified for other values, as described above. As before, for simplicity, all the numbers correspond to the case when SSBI_DATA_WD=8.

Most of the modifications to the logic design pertain to the shift register chain, which are shown in FIG. 30. This chain is extended such that it can store the mode bits (01) and SLAVE_ID, along with pause bits, which are present after every set of 8 bits. These additional pause bits are treated as transmissions (the data values themselves are irrelevant) as opposed to tri-stating the bus (like a prior art SBI block may have done). There is no longer a need to tri-state the bus every 8 symbol periods.

This example modified shift register chain is broken up as follows. SSBI_DATA_OUT is still produced as the output of register 2110, which is used to hold the start bit for the first access of a burst or READ for subsequent accesses of a burst. Register 2110 is still reset with RESET. The enable is modified from FIG. 21, and is formed as the OR of REQP, STB, OVR_MODE, TERM and EN_TERM_CNT. The modification is the addition of the TERM and EN_TERM_CNT signals into the OR logic. The input is taken from mux 3004 (compared with mux 2160 in FIG. 21), and is used to select shift values based on the mode, detailed further below.

Two shift registers 3014 and 3016 are deployed which are 8 and 2 bits wide, respectively. The 8-bit shift register 3014 stores the mode bits (01) and SLAVE_ID. The 2-bit shift register 3016 stores the pause bit and READ bit for the first access in FTM_MODE, or stores the READ bit and address bit 7 when not in FTM_MODE. This input is labeled SHIFT2LDVAL, which is formed as the output of mux 3028, detailed further below. The 7-bit shift register 3018 stores the lower 7 bits of the address (recall that in the SBI protocol, only 7 bits of address are used). Note that shift registers 3016 and 3018 take the place of shift register 2130 (shown in FIG. 21) when not in FTM mode. The three shift registers form a single chain, in that the shift output of shift register 3018 is connected to the shift input of shift register 3016, and the shift output of shift register 3016 is connected to the shift input of shift register 3014. All three shift registers 3014-3108 are enabled with STB, and loaded with REQP.

Shift register 2140 is identical to FIG. 21. The SSBI_DATA_WD bit shift register 2140 is pre-loaded with write data for write operations or all 0's for read operations. The shift input to shift register 2140 is determined as the output of mux 2150, which selects a 0 when SSBI_DATA_OE is asserted, and SSBI_DATA_IN_DEL otherwise. The parallel output of shift register 2140 may be made available as RD_DATA_PRE. As with the other shift registers, shift register 2140 is loaded with REQP and enabled with STB.

Register 3022 is added for use in FTM_MODE to store a pause bit. Register 3022 is reset by REQP. The final pause bit for FTM mode isn't directly stored, but is shifted in to register 3022 from the shift output of shift register 2140.

Since this SSBI master supports normal SSBI mode accesses as well as FTM mode, various muxes are used to either select or bypass additional bits required for FTM mode. Additionally, in FTM_MODE, extra logic is used to bypass the mode bits, slave ID, and pause bit during the second and additional accesses of a burst, in accordance with the signal CONT.

Mux 3020 is used to select the output of register 3022 as the shift input to shift register 3018 when in FTM mode. Otherwise, register 3022 is bypassed, and the output of shift register 2140 is selected.

SHIFT2LDVAL is produced as the output of mux 3028. In FTM mode, READ is concatenated to form the 2-bit value. Otherwise, READ is concatenated with ADDR(7) (as in FIG. 21) to form the 2-bit value.

Mux 3010 is selectable with FTM_MODE to bypass or include shift register 3014 in the shift chain. In FTM mode, the shift out of shift register 3014 is selected. In non-FTM mode, the output of shift register 3016 is selected. The output of mux 3010 is delivered to OR gate 2120, along with REQP, as described with respect to FIG. 21. The output of OR gate 2120 is the bitstream for normal SSBI operation, and for the first access in FTM mode (not including the termination portion of the access, when applicable).

Mux 3006 selects various bitstreams depending on the current mode. The select line is formed as the concatenation of TERM and CONT (shown as TERM & CONT). In SSBI mode, TERM and CONT will always be deasserted, so the output of OR gate 2120 is selected. The output of OR gate 2120 is also selected in FTM mode for the first access, in which case the termination symbol is not yet to be sent (TERM is not asserted) and a continuing access is not in progress (CONT is not asserted).

Prior to termination, and during second and subsequent accesses, CONT will be asserted, so mux 3006 will select the output of mux 3012. Mux 3012 is used for FTM mode, and may be used to bypass the mode bits, slave ID, and pause bit during the second and additional accesses of a burst. When REQP is asserted, READ is selected as the output of mux 3012, otherwise the shift output of shift register 3018 is selected.

Since, in this example, the termination symbol toggles every clock cycle, the termination symbol is formed by inserting the termination symbol bits cycle-by-cycle into the final register 2110 feeding SSBI_DATA_OUT. TERM is used to identify when the termination symbol is sent. This is implemented by feeding NOT CNT_EN into register 2110 as it toggles every cycle (using the inverse of CNT_EN as the input allows the output of register 2110 to be in-phase with CNT_EN). As described above, register 2110 is enabled every clock cycle, due to the TERM signal in the OR logic feeding the enable.

In this example, there are two special cases regarding the termination symbol. First, to suppress sending a termination symbol to slave, DISABLE_TERM_SYM may be asserted. One example for using this feature is to stop slave SSBI_CLK by writing to the slave register bit, TCXO_DIS, as described above. After the write completes, there should be no activity on SSBI_DATA until the time the slave clock is to be enabled again. After this special access, DISABLE_TERM_SYM may be used to block NOT CNT_EN from being sent to final register 2110 feeding SSBI_DATA_OUT. Thus, when TERM is enabled, mux 3006 selects the AND of NOT CNT_EN and NOT DISABLE_TERM_SYM.

In the second case, an option is provided to send a termination symbol without any prior access. This is achieved by asserting SEND_TERM_SYM. This may be useful when the SSBI master 1110 is reset in the middle of a transfer, for example. In such a situation, to avoid the SBI slave being stuck in an infinite FTM loop, the master may send a termination symbol to return the slave to Idle mode again. To enable this second feature, mux 3004 is deployed to select the input for register 2110. As in FIG. 21, OVR_MODE is used to select OVR_VALUE to allow for direct control of the shift chain. When OVR_MODE is not asserted, an assertion of EN_TERM_CNT selects NOT TERM_CNT(0) as the output of mux 3004. Generation of TERM_CNT is detailed below. When neither OVR_MODE nor EN_TERM_CNT are asserted, the output of mux 3006 is selected for input to register 2110.

FIG. 31 illustrates additional control logic for SSBI master 1110, modified to support FTM mode. Compare this example with the example described with respect to FIG. 22. This logic performs all the same functions as the earlier embodiment, with the following modifications.

As before, REQP is formed as the output of AND 2204, with REQ as one of the inputs. For REQP generation, DONE is added so that multiple accesses can be acknowledged within a burst. REQP is latched in flip flop 2206 to produce ACK. The other input to AND 2204 is generated as the OR 3102 of NOT STATE, the AND of DONE and FTM_MODE, and the AND of DONE_DELX and NOT FTM_MODE. Compare this logic with the logic of OR 2202 in FIG. 22.

As before, RD_DATA is generated as the output of register 2208, which takes RD_DATA_PRE as its input. The enable term is modified to include an additional term for FTM mode. The enable is formed by the AND of SREAD, NOT STB, NOT RESET, and BITCNT=19/26. The notation BITCNT=19/26 translates to: when FTM_MODE=0, look for BITCNT=19; when FTM_MODE=1, look for BITCNT=26.

In FTM mode, DONE generation occurs using a later BITCNT that is not SREAD dependent, as reads and writes in FTM mode take the same amount of time. This is implemented in this example with mux 3114. The select line for mux 3114 is FTM_MODE & SREAD. When FTM_MODE is asserted, the output of mux 3114 is BITCNT=27 when SREAD is not asserted and BITCNT=27 otherwise. When FTM_MODE is not asserted, and SREAD is not asserted, the output of mux 3114 is formed as the AND of NOT SREAD and BITCNT=(17+IDLE_SYMS). When FTM_MODE is not asserted, and SREAD is asserted, the output of mux 3114 is given as the AND of SREAD and BITCNT=(19+IDLE_SYMS). DONE is formed as the output of register 3118, which takes as its input the AND 3116 of NOT STB and the output of mux 3114, and is reset with RESET.

Logic is added to generate CONT and TERM, which are all 0 when FTM_MODE is 0. CONT is set to one during the same cycle for which DONE asserts and will clear when DONE_DELX_FTM pulses. CONT is formed as the output of register 3110. This register is set when BITCNT=27, and reset with the OR of DONE_DELX_FTM, RESET, or NOT FTM_MODE. (DONE_DELX_FTM will be either DONE_DELX_FTM_WR or DONE_DELX_FTM_RD depending on whether a write or read is being performed. DONE_DELX_FTM_WR is given by BITCNT=31+IDLE_SYMS, and DONE_DELX_FTM_RD is given by 23+IDLE_SYMS.)

TERM is used to force BITCNT to increment every clock cycle during the termination symbol. TERM is formed as the output of mux 3150, which uses SREAD as its select line. When SREAD is asserted, TERM_READ is selected, otherwise TERM_WRITE is selected. TERM_READ is formed as the AND of FTM_MODE, BITCNT>=28, and BITCNT<=31. TERM_WRITE is formed by the AND of FTM_MODE, BITCNT>=27, and BITCNT<=31.

SREAD, STATE, CNT_EN, and STB are generated the same as in FIG. 22. SREAD is formed as the output of register 2210, with READ as the input and REQP as the enable. STATE is generated as the output of SR flip-flop 2220. The set input to SR flip-flop 2220 is formed as the AND 2216 of REQP and NOT RESET. The reset input to SR flip-flop 2220 is formed as the OR 2218 of DONE_DELX and RESET.

STB (also labeled as CNT_EN) is formed as the output of resettable flip-flop 2224. The input to this flip-flop is the inverse of its output, thus the creation of STB alternating every clock cycle when the flip-flop is not being reset. The reset input, CNT_RES, is formed as the OR 2222 of REQP and NOT STATE.

BITCNT (a 6-bit signal in this example, alternate embodiments may provide different parameters requiring alternate values throughout FIGS. 29-31) is formed as the output of counter 3140 (compare with counter 2228 in FIG. 22). The enable of counter 3140 is the OR 3138 of CNT_EN (or STB) and TERM. In contrast with example of FIG. 22, in this example, the width of BITCNT is increased by 1 bit since with IDLE_SYMS>0 or SSBI_DATA_WD>8, BITCNT may count past 31. The load value for BITCNT is now dependent on whether or not the access is the first of a burst. As such, CONT is used as the select line for mux 3112, which, when asserted, selects 001010 as the value of BITCNT_LDVAL, and 000000 otherwise.

TERM_CNT, which is used to form the termination symbol when SEND_TERM_SYM is asserted, as described above, is formed as follows. EN_TERM_CNT is formed as the output of SR flip-flop 3144. The set input asserts EN_TERM_CNT when SEND_TERM_SYM is asserted. EN_TERM_CNT is deasserted when the termination symbol is completed, as indicated by TERM_CO. The reset for flip-flop 3144 is thus the OR 3142 of RESET and TERM_CO. TERM_CNT is a 2-bit signal in this example, although other termination symbols of various other sizes and waveforms may be deployed within the scope of the present invention. TERM_CNT is formed as the output of counter 3148, whose carryout is assigned to TERM_CO. Counter 3148 is always enabled, except when reset by the OR 3146 of RESET and NOT EN_TERM_CNT. Thus, when EN_TERM_CNT asserts, the reset to counter 3148 is deasserted, which causes the counter to count until the carryout TERM_CO asserts, in turn deasserting ENTERM_CNT.

Recall that an SSBI master 1110 does not use a slave ID for SSBI mode, although slave IDs may be required for SBI mode. Since the slave device will decode the slave ID, it needs to be specified by the microprocessor, or other host device, through a control register, or other techniques well known in the art. This slave ID field may be output to the SSBI master 1110 for each transaction. Note that, unlike with SBI, this field may be programmed just once and never needs to change, when a single slave is connected to an SSBI port. In addition, FTM_MODE specifies whether the transfer should be done in FTM mode or not which allows the same SSBI master 1110 to be used with true 1-wire slaves as well as 1-wire slaves that use an SSBI to SBI converter block, such as block 1420, detailed further below.

SSBI Slave Supporting FTM

For a slave device that needs to support the 3-wire bus and 1-wire bus, one approach is to design the slave to retain a 3-wire SBI support block 1220 as shown in FIG. 14, and to add an SSBI slave converter 1420 that allows it to interface to a 1-wire bus. The SSBI slave converter block 1420 may be used to convert 1-wire signaling to generate the SBST and SBCK signals and feed those to the existing 3-wire SBI slave circuitry 1220. Thus, for this example, in 1-wire mode, FTM commands must be used, as SSBI commands would not be properly interpreted by the 3-wire slave circuitry 1220. Table 5 includes port descriptions for an example SSBI slave converter 1420.

TABLE 5

SSBI Slave Converter Port Descriptions

| Port | Direction | Description |
| --- | --- | --- |
| SSBI_CLK | Input | Clock |
| RESET | Input | Async input. This block will stretch it until TCXO turns on. |
| SBST_IN | Input | SBST input from chip pad. |
| SBCK_IN | Input | SBCK input from chip pad. |
| SSBI_DATA | Input | SSBI_DATA/SBDT input from chip pad. |
| SBST_OUT | Output | 3-wire SBST signal going to SBI Slave block. |
| SBCK_OUT | Output | 3-wire SBCK signal going to SBI Slave block. |
| SBDT_PO_IN | Input | 3-wire SBDT, PO signal coming from SBI Slave block. |
| SBDT_OE_IN | Input | 3-wire SBDT, OE signal coming from SBI Slave block. |
| SBDT_PO_OUT | Output | 3-wire SBDT, PO signal going to chip pad. |
| SBDT_OE_OUT | Output | 3-wire SBDT, OE signal going to chip pad. |
| SSBI_MODE | Output | SBCK_IN and SBST_IN indicating that the slave is in 1-wire mode. |
| TCXO_DIS | Input | It comes from slave register block. It is '0' is normal operation, '1' when SSBI_CLK is off. |
| RESET_TCXO_DIS | Output | It goes to slave register block to reset TCXO_DIS register bit. |

An example SSBI slave converter 1420 may be used for converting SSBI signaling into SBI signaling when in 1-wire mode, or bypassing such conversion when in 3-wire mode. Specifically, SSBI slave converter takes in the SSBI_DATA line, among others, and generates the SBCK and SBST signals for a standard 3-wire SBI slave block. In this example, SBDT does not need to be generated in SSBI slave converter 1420, as it is may be directly connected between the pad and 3-wire slave block, as described above with respect to FIG. 14.

The SBST and SBCK inputs may be used to determine if 1-wire or 3-wire operation is desired. 1-wire mode is selected when SBST=1 and SBCK=0, as such a combination never occurs during normal 3-wire transfers. This option for selecting the mode avoids the need for a dedicated mode selection pin or register. If 3-wire mode is selected, then the SBST and SBCK signals are muxed through to the outputs of this block, as detailed further below.

In 1-wire mode, the SSBI slave converter block 1420 examines the SSBI_DATA line for the start symbol, which is used to assert SBST and start SBCK toggling. The SSBI slave converter block 1420 also looks for the termination symbol, which is used to de-assert SBST and halt SBCK toggling. Write data goes directly to the SBI slave block, and, similarly, read data is returned directly onto SBDT. An example embodiment illustrating these features is detailed below with respect to FIGS. 32-35.

FIG. 32 illustrates a portion of SSBI slave converter 1420. The circuitry shown is responsible for determining whether the mode is 1-wire or 3-wire. SSBI_MODE goes high for 1-wire mode when SBCK=0 while SBST=1, as shown by the AND 3250 of SBST_IN and NOT SBCK_IN. SSBI_MODE is delivered as an output, in this example, in case other functions or blocks operate in accordance with the selected mode. SSBI_MODE is also used to control muxes 3260 and 3270. When in 3-wire mode, i.e. SSBI_MODE is not asserted, the SBCK and SBST pad inputs (SBST_IN and SBCK_IN, respectively) are selected for output to SBST_OUT and SBCK_OUT, respectively. When in 1-wire mode, i.e. SSBI_MODE is asserted, muxes 3260 and 3270 select SBST_GEN and SBCK_GEN to be output on SBST_OUT and SBCK_OUT, respectively.

RESET_EFF is a stretched reset signal, generated so that it is a minimum of two clock cycles. This ensures that RESET_EFF will be eventually seen by the circuitry even if the clock is off. Asynchronously settable flip-flops 3220, 3230, and 3240 are set by the OR 3210 of TCXO_DIS and RESET. RESET_EFF is formed as the output of flip-flop 3240. The input of flip-flop 3240 is the output of flip-flop 3230, whose input is the output of flip-flop 3220. The input to flip-flop 3220 is set to zero.

In this example, SSBI_DATA should be very similar to SBDT, so that write and read timing is relatively the same, regardless of whether or not the SSBI to SBI conversion occurs. Consider an example where SSBI_DATA is sampled and SBDT is created with even one clock cycle delay. This would cause the slave SBI block (i.e. 1220) to see all accesses one cycle later. For writes, this likely would not be a problem. For reads, though, when the returned data appears, it would come out one cycle later than when the master device would be expecting it. As a result, it is necessary that the SSBI_DATA be fed onto SBDT without any register delays. As such, the next problem is to detect the start symbol and generate the SBST and SBCK signals in time to meet the SBI slave timing. This may be somewhat tricky, since in the duration of two symbols (the start symbol and first data symbol), the SSBI slave converter 1420 needs to do the following: 1. Recognize the start symbol. 2. Force SBST to assert (go low). 3. Force SBCK low, then allow it to toggle such that a falling edge occurs every two clock cycles. 4. The second SBCK falling edge will be used to sample SBDT in the SBI Slave.

Consider an example in which the SSBI_DATA line is in the idle state, then the SSBI slave converter 1420 samples the SSBI_DATA line on SSBI_CLK rising until it sees a start symbol. FIG. 33 illustrates the waveforms for the start of the transfer. The start symbol is "found" and the signal "deglitched" in half a clock cycle causing FOUND_ST to assert. This asynchronously forces SBST low, which in turn disables the circuit searching for the start symbol. FOUND_ST is delayed half a clock cycle, ANDed with itself, then used to cause the first falling edge and rising edge of SBCK to occur. SBST and FOUND_ST are used together to enable SBCK to toggle. Since the SBI slave samples the symbols on SBCK falling, they are effectively being sampled 25% into the symbol period.

Note that SSBI_CLK may not be lined up as shown. What is depicted in FIG. 33 is actually the "best" case. The "worst" case occurs such that the start symbol is not detected immediately, but rather a full clock cycle later. In this case, all the signals, FOUND_ST, SBST, SBCK shift to the right by 1 clock cycle. Accordingly, the data symbols are being sampled 75% into the symbol period. As will be apparent, for both cases, SBST and SBCK may be generated correctly with respect to SSBI_DATA. LATE is similar to the identically named signal, detailed above with respect to FIG. 25, which helps in reducing this one cycle of variability (in SBDT_PO and SBDT_OE) to half a clock cycle.

The waveforms for the end of a transfer are shown in FIG. 34. Capturing the termination symbol may be somewhat complicated since it toggles every clock cycle for four consecutive clock cycles. This example termination symbol is selected, because it is the shortest waveform that is distinguishable from any symbol data. An example circuit used to sample this waveform basically samples SSBI_DATA over 4 clock cycles looking for the pattern. A separate circuit operates in parallel but sampling on the falling clock edge. This is necessary since, if the SSBI_CLK rising edge is aligned with the termination symbol transitions, there's no guarantee the symbol will be caught by the first circuit. Hence, together, both circuits guarantee the termination symbol will be found.

FIG. 35 illustrates a portion of additional circuitry for an example SSBI slave converter 1420. The stretched reset, RESET_EFF, causes SBST_GEN and SBCK_GEN to asynchronously go high. The stretched reset is used to ensure it remains asserted until SSBI_CLK has turned on. This reset also resets part of the circuitry generating FOUND_T, detailed below.

SSBI_DATA is latched with SSBI_CLK in register 3508, which is reset with NOT SBST_GEN. The output of register 3508 is delivered as the input to register 3510, clocked by the inverse of SSBI_CLK, also reset with NOT SBST_GEN. The output of register 3510 is labeled FOUND_ST, indicating a start has been found.

SSBI_DATA is also input to register 3502, clocked by the inverse of SSBI_CLK. The output of register 3502 is input to register 3504, the output of which is labeled FOUND_ST_N. Both registers 3502 and 3504 are reset by RESET_EFF. FOUND_ST_N is latched in register 3506, clocked by SSBI_CLK, to produce LATE. Register 3506 is enabled by FOUND_ST.

FOUND_ST is used to asynchronously set flip-flop 3518, the output of which is inverted 3520 to produce SBST_GEN. Thus, a found start bit asserts (drives low) SBST_GEN. Recall that NOT SBST_GEN resets the registers 3508 and 3510 which generate FOUND_ST, thus FOUND_ST will be deasserted until the current access or accesses are complete, and a new start bit is found. Flip-flop 3518 is clocked by the inverse of SSBI_CLK, and reset by RESET_EFF. A zero is clocked in when enabled by FOUND_T, which indicates a termination symbol has been found, detailed further below.

Register 3522, reset by RESET_EFF, takes FOUND_ST as an input and delays it by a cycle. Its output, SBCK_EN, is delivered to NAND 3524, along with FOUND_ST, which is used to force SBCK_GEN low through AND 3526. The other input to AND 3526 is used to generate SBCK_GEN when NAND 3524 is not forcing SBCK_GEN low, and comes from the output of register 3514. Register 3514 is clocked by the inverse of SSBI_CLK, and is asynchronously set with RESET_EFF. Its output, in addition to being delivered to AND 3526, is inverted in inverter 3516. Its input is generated as the OR 3512 of SBST_GEN, FOUND_ST, FOUND_T, and the output of inverter 3516. SBCK_EN and FOUND_T are used to stop SBCK from toggling before SBST de-asserts.

As described above, two circuits are deployed to identify the termination symbol. In each circuit, SSBI_DATA is shifted into two series of 5 registers, 3528-3536 and 3542-3550, respectively. The termination symbol pattern is detected with two AND gates, 3538 and 3552. The first circuit has register 3528 clocked by the inverse of SSBI_CLK, and registers 3530-3536 clocked by SSBI_CLK. Registers 3528, 3530, and 3532 are asynchronously reset by RESET_EFF.

The termination pattern is located with the AND 3538 of the inverse of register 3530, register 3532, the inverse of register 3534, and register 3536. The second circuit has register 3542 clocked by SSBI_CLK, and registers 3542-3550 clocked by the inverse of SSBI_CLK. Registers 3542, 3544, and 3546 are asynchronously reset by RESET_EFF. The termination pattern is located with the AND 3552 of the inverse of register 3544, register 3546, the inverse of register 3548, and register 3550. The OR 3540 of the two circuits (whose outputs are the outputs of ANDs 3538 and 3552) creates FOUND_T, indicating a termination symbol has been found.

Note that FOUND_T may be 1 or 1.5 cycles long depending on whether one or both circuits detect the termination symbol. This may constrain how quickly a subsequent transfer may be made on the bus. In the example embodiment, this will not cause any problem. In an alternate embodiment, a master can force SSBI_DATA to transfer an idle symbol for at least one symbol period, if needed.

Note further that this circuit will not assert FOUND_T unless a termination-symbol is present. Given that data symbols change every two clock cycles, if the clock is not aligned with the symbol transitions, sampling a symbol in two consecutive clock cycles will sample the same value, not the alternating value for the termination symbol. If the sampling clock is aligned with the symbol edges, then it may sample either the previous or new symbol value. As an example, consider a case where the first sample edge is aligned with the symbol transition, hence so is the third edge, but not the second and fourth, as those would occur in the middle of a symbol. Keeping in mind that the desired pattern is 1010, for the second and fourth samples to see a 0, the two data symbols have to be 0. If that is true, then the third sample will have to be 0, since the data did not change. As a result, FOUND_T will not assert. A similar argument can be made for the case where the second and fourth samples are aligned with symbol boundaries while the first and third are not.

Again, note that SSBI_CLK may not be lined up as shown in FIGS. 33 and 34. What is depicted is actually the "best" case. The "worst" case occurs such that the termination symbol is detected half a clock cycle later. In this case, FOUND_T shifts to the right by half a clock cycle, which doesn't affect SBST or SBCK. As can be seen, for both "best" and "worst" cases, extra SBCK pulses are passed to the SBI Slave block. It is expected that the SBI Slave will ignore the extra data bits once SBST is deasserted.

LATE is used to alter the timing of the SBDT output when in SSBI_MODE. SBDT_OE_OUT is formed as the output of mux 3560, which takes as its inputs SBDT_OE_IN and a delayed version, as latched in register 3558. Register 3558 takes SBDT_OE_IN as its input and delays the input by one cycle. SBDT_PO_OUT is formed as the output of mux 3566, which takes as its inputs SBDT_PO_IN and a delayed version, as latched in register 3564. Register 3564 takes SBDT_PO_IN and delays the input by one cycle. The select for both muxes 3560 and 3566 is formed as the OR 3562 of LATE and NOT SSBI_MODE. Thus, when not in SSBI_MODE, SBDT_OE_OUT is selected as SBDT_OE_IN, and SBDT_PO_OUT is selected as SBDT_PO_IN. The same selection is made for both when in SSBI_MODE and LATE is not asserted. When LATE is asserted in SSBI_MODE, the delayed versions of SBDT_OE_IN and SBDT_PO_IN are selected for their respective outputs.

RESET_TCXO_DIS is formed as the output of register 3556, which takes the output of register 3554 as its input. Register 3554 receives TXCO_DIS as its input. Register 3554 is clocked by SSBI_DATA. Register 3556 is clocked by the inverse of SSBI_DATA. Both registers are asynchronously reset by RESET. Thus, when TCXO_DIS is asserted, a rising edge of SSBI_DATA sets register 3554, and a subsequent falling edge of SSBI_DATA sets register 3556, asserting RESET_TCXO_DIS. As such, SSBI_DATA can be used to assert RESET_TCXO_DIS, when the clock (i.e. SSBI_CLK, as well as other clocks) is disabled. In an example embodiment, RESET_TCXO_DIS may be used to re-enable one or more disabled clocks.

Additional Alternate Embodiments

Additional embodiments are envisioned. For example, it may be desirable to interface newer SSBI slave devices with legacy SBI masters. As such, a 3-wire to 1-wire converter may be deployed, receiving the SBST, SBCK, and SBDT signals and generating a single SSBI_DATA signal therefrom. Such a converter may be deployed within an SSBI slave device, to allow for either type of interface to be supported, without the use of an SBI slave, as detailed above. Alternately, such a converter may be added to a legacy master device, to intercept the 3-wire protocol and generate a single wire interface therefrom. In other alternatives, the converters described herein may be deployed as standalone components, external to either a master or slave of either type (SBI or SSBI).

Another embodiment of a slave may include both SBI and SSBI slave interfaces. A sensor may be deployed to monitor an incoming data line (which may be shared for both SSBI_DATA or SBDT), and determine which type of protocol is being used on the incoming lines. In the alternative, a slave may be programmable to select one slave interface or the other (SBI or SSBI). Those of skill in the art will recognize myriad combinations of 3-wire and 1-wire masters, slaves, and converters, which may be deployed within the scope of the present invention, in light of the teaching herein.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A master device configured to communicate with a slave device, the master device comprising:
   a plurality of pins, wherein at least one pin of the plurality of pins is selectively configured to operate as a single-wire interface or as part of a three-wire interface based on a mode signal, wherein the at least one pin is configured to operate as the single-wire interface in a first mode, and wherein the at least one pin is configured to operate as the three-wire interface in a second mode;
   a local clock that is isolated from and phase independent of a local clock in the slave device; and
   circuitry for exchanging control and data with the slave device over a single wire serial bus at a clock rate determined by the local clock of the master device.

2. The master device of claim 1, wherein the single wire serial bus performs the exchanging of the control and the data in accordance with a Single-Wire Serial Bus Interface protocol, wherein the Single-Wire Serial Bus Interface protocol does not include a clock line.

3. The master device of claim 2, wherein the circuitry includes logic for correcting a phase offset or a frequency offset between the clock rate of the master device and a clock rate of the local clock in the slave device.

4. The master device of claim 1, wherein the single wire serial bus performs the exchanging of the control and the data in accordance with a Single-Wire Serial Bus Interface protocol, wherein the Single-Wire Serial Bus Interface protocol does not include a start/stop line.

5. The master device of claim 1, wherein the circuitry includes logic for correcting a phase offset or a frequency offset between the clock rate of the master device and a clock rate of the local clock in the slave device.

6. The master device of claim 1, wherein the single wire serial bus performs the exchanging of the control and the data in accordance with a Single-Wire Serial Bus Interface protocol, further comprising logic circuitry for:
   converting the control and the data to be sent to the slave device into a three-wire interface signal; and
   outputting the converted control and the converted data in a format compatible with a Serial Bus Interface (SBI) protocol.

7. The master device of claim 1, wherein the master device is configured to drive a plurality of slave devices over the single-wire interface.

8. The master device of claim 1, wherein the master device is configured to drive a plurality of slave devices, and wherein the master device drives each slave device of the plurality of slave devices over a corresponding single-wire serial bus interface associated with each slave device.

9. A slave device configured to communicate with a master device, the slave device comprising:
   a plurality of pins, wherein a first pin of the plurality of pins is selectively configured to operate as a single-wire interface or as part of a three-wire interface based on a mode, wherein the at least one pin is configured to operate as the single-wire interface in a first mode, and wherein the at least one in is configured to operate as the three-wire interface in a second mode;
   a local clock that is isolated from and phase independent of a local clock in the master device; and
   circuitry for exchanging control and data with the master device over a single wire serial bus at a clock rate determined by the local clock of the slave device.

10. The slave device of claim 9, wherein the single wire serial bus performs the exchanging of the control and the data in accordance with a Single-Wire Serial Bus Interface protocol, wherein the Single-Wire Serial Bus Interface protocol does not include a clock line.

11. The slave device of claim 10, wherein the Single-Wire Serial Bus Interface protocol does not include a start/stop line, wherein the circuitry includes logic for correcting a phase offset or a frequency offset between the clock rate of the slave device and a clock rate of the local clock in the master device.

12. The slave device of claim 9, wherein the mode is determined based on a first value of a second pin of the plurality of pins and based on a second value of a third pin of the plurality of pins.

13. The slave device of claim 12, wherein, when the first pin is configured to operate as part of the three-wire interface, the three-wire interface includes the first pin, the second pin, and the third pin.

14. The slave device of claim 9, wherein the circuitry includes logic for correcting a phase offset or a frequency offset between the clock rate of the slave device and a clock rate of the local clock in the master device.

15. The slave device of claim 9, wherein the single wire serial bus performs the exchanging of the control and the data in accordance with a Single-Wire Serial Bus Interface protocol, and further comprising logic circuitry for:
    converting the control and the data to be sent to the master device into a three-wire interface signal; and
    outputting the converted control and the converted data in a format compatible with a Serial Bus Interface (SBI) protocol.

16. The slave device of claim 9, wherein the slave device is configured in parallel with a plurality of slave devices, wherein the slave device and the plurality of slave devices are each configured to be coupled to the master device over the single-wire interface.

17. The slave device of claim 9, wherein the slave device is configured in parallel with a plurality of slave devices, and wherein each of the slave device and the plurality of slave devices are configured to be coupled to the master device over a corresponding dedicated single-wire serial bus interface.

18. A method of exchanging control and data from a first device to a second device over a single wire serial bus interface, the method comprising:
    selectively configuring at least one pin of a plurality of pins of the first device to operate as a single-wire interface or as part of a three-wire interface based on a mode signal, wherein the at least one in is configured to operate as the single-wire interface in a first mode, and wherein the at least one in is configured to operate as the three-wire interface in a second mode; and
    clocking transmitted and received bits using a protocol by use of a local clock in the first device that is isolated from and phase independent of a local clock in the second device and at a clock rate determined by the local clock of the first device.

19. The method of claim 18, further comprising, at the first device, correcting offsets in phase and frequency between the clock rate of the first device and the clock rate of the local clock in the second device.

20. The method of claim 19, further comprising receiving the mode signal at a multiplexer, wherein the at least one pin is selectively configured based on the multiplexer.

21. A computer program product stored in a non-transitory computer-readable medium for use in a first device configured for exchanging control and data from a first device to a second device over a single wire serial bus interface, the computer program product including instructions for causing the first device to:
    selectively configure at least one pin of a plurality of pins of the first device to operate as a single-wire interface or as part of a three-wire interface based on a mode signal, wherein the at least one in is configured to operate as the single-wire interface in a first mode, and wherein the at least one in is configured to operate as the three-wire interface in a second mode; and
    clock transmitted and received bits using a protocol by use of a local clock in the first device that is isolated from and phase independent of a local clock in the second device and at a clock rate determined by the local clock of the first device.

22. The computer program product of claim 21, further comprising instructions for causing the first device to correct a phase offset or a frequency offset between the clock rate of the first device and a clock rate of the local clock in the second device.

23. A device configured to communicate with a second device, the device comprising:
    means for selectively configuring, based on one or more signals associated with a mode, at least one pin of a plurality of pins to operate as a single-wire interface or as part of a three-wire interface, wherein the at least one in is configured to operate as the single-wire interface in a first mode, and wherein the at least one in is configured to operate as the three-wire interface in a second mode;
    means for generating a local clock signal that is isolated from and phase independent of a clock signal generated by the second device; and
    means for exchanging control and data with the second device over a single wire serial bus at a clock rate based on the local clock signal of the device.

24. The device of claim 23, wherein the control and the data are exchanged via the single wire serial bus in accordance with a Single-Wire Serial Bus Interface protocol, wherein the Single-Wire Serial Bus Interface protocol does not include a clock line.

25. The device of claim 24, wherein the Single-Wire Serial Bus Interface protocol does not include a start/stop line.

26. The device of claim 23, wherein the control and the data are exchanged via the single wire serial bus in accordance with a Single-Wire Serial Bus Interface protocol, wherein the Single-Wire Serial Bus Interface protocol does not include a start/stop line.

27. The device of claim 23, wherein the means for exchanging includes means for correcting a phase offset or a frequency offset between the clock rate of the device and a clock rate of the second device.

* * * * *